United States Patent
Youssef et al.

(10) Patent No.: US 11,879,735 B2
(45) Date of Patent: Jan. 23, 2024

(54) GYROSCOPE USING TORUS SHAPED CHANNELS AND IMAGE PROCESSING

(71) Applicant: UTI LIMITED PARTNERSHIP, Calgary (CA)

(72) Inventors: Ahmed Youssef, Calgary (CA); Naser El-Sheimy, Calgary (CA)

(73) Assignee: UTI LIMITED PARTNERSHIP, Calgary (CA)

( * ) Notice: Subject to any disclaimer, the term of this patent is extended or adjusted under 35 U.S.C. 154(b) by 135 days.

(21) Appl. No.: 17/298,655

(22) PCT Filed: Jan. 23, 2020

(86) PCT No.: PCT/CA2020/050076
§ 371 (c)(1),
(2) Date: May 31, 2021

(87) PCT Pub. No.: WO2020/150824
PCT Pub. Date: Jul. 30, 2020

(65) Prior Publication Data
US 2022/0011110 A1    Jan. 13, 2022

Related U.S. Application Data

(60) Provisional application No. 62/796,231, filed on Jan. 24, 2019.

(51) Int. Cl.
*G01C 19/14*    (2006.01)
*G01C 19/42*    (2006.01)

(52) U.S. Cl.
CPC ............. *G01C 19/14* (2013.01); *G01C 19/42* (2013.01)

(58) Field of Classification Search
CPC ........ G01C 19/20; G10C 19/42; G01P 15/006
See application file for complete search history.

(56) References Cited

U.S. PATENT DOCUMENTS

| 2,778,623 A | 1/1957 | Statham |
| 2,951,375 A | 9/1960 | Summers, Jr. |

(Continued)

FOREIGN PATENT DOCUMENTS

EP    566130 A1    10/1993

OTHER PUBLICATIONS

Noureldin, A., Karamat, T., Georgy, J. "Fundamentals of Inertial Navigation, Satellite-based Positioning and Their Integration". 2013. XVIII, 17 Pages. Springer-Verlag Berlin Heidelberg.

(Continued)

*Primary Examiner* — Paul M. West
*Assistant Examiner* — Mark A Shabman
(74) *Attorney, Agent, or Firm* — Brion Raffoul

(57) ABSTRACT

Systems and methods related to gyroscope related applications. A platform having at least one torus shaped channel that is filled with a liquid is used in conjunction with at least one marker to determine the direction of forces applied to the platform. Each marker is neutrally buoyant within the liquid and a marker tracking system is used to determine the displacement of the marker from its resting place after a force has been applied to the platform. The tracking system may be based on at least one digital camera in conjunction with suitable image processing software to determine the marker's position before, during, and after the force has been applied. A gyroscope can be constructed using three such platforms with each platform being orthogonal to the other two. Each platform may have multiple concentric channels with a common center with each channel having a different sensitivity to the applied forces.

11 Claims, 17 Drawing Sheets

(56) References Cited

U.S. PATENT DOCUMENTS

| | | | |
|---|---|---|---|
| 2,951,377 | A | 9/1960 | Lahde |
| 2,983,149 | A | 5/1961 | Lees |
| 3,131,565 | A | 5/1964 | Amlie |
| 3,142,991 | A | 8/1964 | Pittman |
| 3,203,237 | A | 8/1965 | Ogren |
| 3,230,765 | A | 1/1966 | Senstad |
| 3,240,060 | A | 3/1966 | Doyle |
| 3,254,538 | A | 6/1966 | Thomson |
| 3,261,213 | A | 7/1966 | Zeldman |
| 3,359,806 | A | 12/1967 | Pittman |
| 3,367,194 | A | 2/1968 | Diamantides |
| 3,447,383 | A | 6/1969 | Camarata |
| 3,452,768 | A | 7/1969 | Sieracki |
| 3,454,023 | A | 7/1969 | Burke |
| 3,516,280 | A * | 6/1970 | Bryant .................. G01C 19/14 74/5.43 |
| 3,520,196 | A | 7/1970 | Morris |
| 3,529,613 | A | 9/1970 | Neradka |
| 3,603,158 | A | 9/1971 | Schiltz |
| 3,604,273 | A | 9/1971 | Heilmann |
| 3,682,003 | A * | 8/1972 | Sage .................... G01P 15/132 73/503 |
| 3,810,393 | A | 5/1974 | MacDonald |
| 4,002,077 | A | 1/1977 | Taplin |
| 4,087,919 | A | 5/1978 | Huvers |
| 4,232,553 | A | 11/1980 | Benedetto |
| 4,361,040 | A | 11/1982 | Taplin |
| 4,945,764 | A | 8/1990 | Frederick |
| 2003/0047002 | A1 | 3/2003 | Townsend |
| 2012/0174696 | A1 * | 7/2012 | Agafonov ............. G01C 19/14 74/5 R |
| 2014/0002617 | A1 * | 1/2014 | Zhang .................. H04N 13/243 348/48 |
| 2018/0059134 | A1 * | 3/2018 | Yee ....................... G01C 19/58 |

OTHER PUBLICATIONS

Groves, Paul D. "Navigation using Inertial Sensors" IEEE Aerospace and Electronic Systems Magazine. vol. 30, No. 2. Feb. 2015. 51 Pages. University College London, United Kingdom.

Titterton, D., Weston, J., Weston, L. "Strapdown Inertial Navigation Technology". Book. The Institution of Engineering and Technology London and The American Institute of Aeronautics and Astronautics. 2004. XVII, 35 Pages.

Andreou, C., Pahitas, Y., Georgiou, J. "Bio-Inspired Micro-Fluidic Angular-Rate Sensor for Vestibular Prostheses" Sensors. vol. 14, No. 7. Jul. 2014. 13 Pages. University of Nicosia, Cyprus.

Liu, S., Zhu, R. "Micromachined Fluid Inertial Sensors" Sensors. vol. 17, No. 2. Feb. 2017. 24 Pages. Tsinghua University, Beijing, China.

Wolfaardt, H., Heyns, P. "Dynamic Modeling of a Novel Microfluidic Channel Angular Accelerometer" Journal of Vibration and Control. Vol. 14, No. 4. Apr. 2008. 17 Pages. University of Pretoria, South Africa.

Lawrence, Anthony. "Modern Inertial Technology: Navigation, Guidance, and Control." Mechanical Engineer Series. 4 pages. Second Edition. Springer. Nov. 2001.

* cited by examiner

GYROSCOPE USING TORUS SHAPED CHANNELS AND IMAGE PROCESSING

CROSS REFERENCE TO RELATED APPLICATIONS

This application is a 35 U.S.C. 371 national stage filing and claims priority to International Application No. PCT/CA2020/050076 filed on Jan. 23, 2020, entitled "GYROSCOPE USING TORUS SHAPED CHANNELS AND IMAGE PROCESSING" which claims the benefit of U.S. Provisional Application No. 62/796,231 filed on Jan. 24, 2019 each of which are incorporated herein by reference in their entirety.

TECHNICAL FIELD

The present invention relates to navigational tools. More specifically, the present invention relates to systems and methods relating to assemblies and sub-assemblies for use in a fluid-based gyroscope.

BACKGROUND

Navigation is a process by which a moving platform determines its state of motion through navigation states. The navigation states for any given platform are the position, velocity, and attitude of the platform. The navigation states should be able to characterize the motion of any given body in either two-dimensional (2-D) or three-dimensional (3-D) space [1].

Navigation is performed through various methods. Such methods can be categorized into two clusters: position fixing, and dead reckoning. Position fixing is the process by which the navigation states are driven through the knowledge and use of a set of fixed, well-defined positions. One example of position fixing navigation is navigation by using the global navigation satellite systems (GNSS). In contrast, dead-reckoning is a process by which the navigation states are determined through a recursive process of relative positioning with respect to the initial states. One example of dead reckoning navigation is navigation using inertial navigation systems (INS) [1].

Inertial Navigation is performed by processing the data of inertial measurement units (IMUs). IMUs are assemblies of sensors that are mounted in a geometric form that guarantees the capture of the motion of any given platform. Such sensors measure inertial measurements, and these sensors include accelerometers (which measure specific forces (e.g., linear accelerations)), and gyroscopes (which measure angular rates). The inertial measurements undergo a mathematical process, known as INS mechanization, that mainly include integrations and geometric transformations to determine the navigation states of the moving platform with respect to a pre-defined reference frame. A typical IMU uses a triad of accelerometers and a triad of gyroscopes, placed along three mutually orthogonal axes.

Inertial sensors endure systematic errors which can be calibrated for in the laboratory and eliminated from the raw inertial measurements. Such systematic errors include biases, scale factor, scale factor non-linearity, and cross-coupling. The bias is a constant error where the inertial sensor reads out a measurement that is at a constant offset from the actual value. The scale factor is an error that is shown by the existence of a gradient for the input-output relation of the inertial sensor which is not unity. However, if such a gradient is non-linear, then it is said that the inertial sensor suffers from scale factor non-linearity. Cross-coupling error indicates that a given inertial sensor (i.e. the accelerometer or the gyroscope) measures residual inertial measurements from an axis that is orthogonal to the inertial sensor's sensitive axes. Typically, cross-coupling occurs due to the non-orthogonality of the sensitive axis of the inertial sensors [2].

In addition to the above, inertial sensors suffer from random errors that appear as noise, within the inertial measurements, from electrical and mechanical sources. The noise is assumed to be white for frequencies below 1 Hz. The order of magnitude of such noise depends on the technology behind the manufacturing of inertial sensor.

The performance of any given IMU is defined by the order of magnitude of the systematic and random errors. Accordingly, IMUs are classified into various categories according their performance and accuracy.

IMUs are classified into: strategic grade, navigation grade, tactical grade, automotive grade, and low-cost consumer grade IMUs. Strategic grade IMUs, also referred to as marine grade IMUs, are the highest quality IMUs. Strategic grade IMUs can be used in military ships, submarines, some intercontinental ballistic missiles, and some spacecraft. A strategic grade IMU might cost more than $1 million per unit.

Conversely, navigation grade IMUs are used in military aircraft and commercial aviation. Navigation grade IMUs cost around $100,000 per unit. Tactical grade IMUs can only be used for stand-alone inertial navigation for a few minutes. However, an accurate navigation solution can be obtained by integrating tactical grade IMUs with an aiding positioning system. Typically, tactical grade IMUs are used in guided weapons and unmanned air vehicles (UAVs). Tactical grade IMUs cost around $2,000 to $50,000 per unit. Automotive grade and consumer grade IMUs are the lowest grade of inertial sensors. These are typically used in pedometers, antilock braking systems, active suspension systems, and airbags. Consumer grade accelerometers costs start around $1 per unit, and the gyroscopes costs start, per unit, around $10 [2].

It should be clear that the IMU grades are analogous to the technologies adopted to manufacture their inertial sensors (i.e. their accelerometers, and gyroscopes). Typical commercial gyroscopes are classified into optical gyroscopes and vibratory gyroscopes. Optical gyroscopes utilize the phase of light waves to determine the angular rates. These optical gyroscopes are realized by using either ring laser gyroscope (RLG) technology or interferometric fiber-optic gyro (IFOG) technology [2]. Vibratory gyroscopes are low-cost and often depend on MEMS technology where quartz-based gyros provide better performance than silicon-based gyros. It should also be noted that there are other types of gyroscopes and these include nuclear magnetic resonance gyroscope technology and cold-atom interferometry-based gyroscopes. Both these technologies provide relatively higher performance but at a higher cost [2].

A main characteristic for the inertial navigation systems (INS) is the bias instability, regardless of the grade of the INS. The navigation solution that is acquired from inertial navigation systems tends to drift from the actual occupied trajectory due to variations in the bias offset value and this drift is referred to as bias instability. However, while lower the bias instability leads to a higher the grade of IMU, this bias instability is inevitable. The bias instability tends to be a stochastic error that cannot be evaluated directly using a mathematical model and this makes handling its effects a sophisticated aspect of research in inertial navigation.

Regarding work on navigation sensors that use fluids, there are a lot of reported sensors that operate by using fluid as the inertial proof mass of such navigation sensors. Other sensors use fluids as a part of the inertial sensing mechanism. There are quite a number of reported inertial angular motion sensors that use fluids when measuring angular rates.

One type of inertial sensor that utilizes fluids as a part of its inertial sensing mechanism is the Rate Integrating Gyroscope (RIG). The rate integrating gyroscope was originally conceived of and implemented in the 1960s. These rate integrating gyroscopes rely on the conservation of momentum and on the trade-off between spatial rigidity and precession of a high-rate spinning rotor in 3-D space. One embodiment of the rate integrating gyroscopes uses a high-rate spinning rotating body that, having sufficient moment of inertia about its spin axis, should maintain a fixed spin axis in 3-D space, unless the body acted upon by an external torque. When acted upon by an external torque, this would lead the rotor to precess, such that the spin axis would follow the direction of the applied torque axis [3]. Many US patents were published on variants to the general concept of the rate integrating gyroscopes (see [4]-[9]).

Another type of fluid-based angular rate sensor is the magnetohydrodynamic (MHD) angular rate sensor. MHD angular rate sensors deploy the magnetohydrodynamic properties of fluid to measure the angular rate [3]. The magnetohydrodynamic effect implies that magnetic fields can induce electric currents in a moving conductive fluid (such as mercury). The induced current can polarize the flow, which in turn affects the applied magnetic field itself. The magnetohydrodynamic effect can be mathematically modeled using the Navier-Stokes equations for momentum conservation for incompressible fluids and Maxwell's equations for electromagnetism. The variations in the magnetic field are detected as an indication of the external angular motion imparted to these types of sensors.

Dual Axis Rate Transducer (DART) is another form of sensor that uses fluid as a part of its inertial sensing mechanism. This type of angular rate sensor was first implemented in the 1960s in the United States. The sensor operation concept utilizes the law of conservation of momentum for a fluid body subjected to external inertial forces. The DART sensor deploys a sphere of heavy liquid, such as mercury, as the sensing inertial element. The fluid sphere is contained within a spherical cavity. The spherical cavity is rotated via a driver motor at high speed such that the fluid sphere maintains a high angular momentum. Deflectable paddles are fixed at the periphery of the spherical cavity and pass through the fluid sphere. The paddles are attached to piezoelectric crystals. The paddles are used as a motion transduction mechanism. The device is sensitive to rotation about the two orthogonal axes, which are normal to the spin axis of the spherical cavity [3].

Jet flow Gyroscopes are another type of fluid-based inertial angular rate sensor. The development of this type of sensor occurred in the 1960s. The scientific concept behind fluid flow rate sensors is that of utilizing the fluid to be the inertial sensing element instead of using the fluid to drive or support a mechanical element. The sensors use the concept of temperature or pressure variations on a fluid control volume under the impact of external motion imparted to the control volume. These temperature and pressure variations are modeled by what is known as the Navier-Stokes equations, which describe the law of conservation of momentum for a fluid mass. Because mathematical evaluation of the Navier-Stokes equations is not a straight-forward problem, the detection of the external angular rate imparted to these kinds of sensors is dependent on the proportionality between the external motion and the temperature or pressure variations that occur within the sensor internal structure. The popular embodiments of this type of sensor can be found under the name "flueric sensors" in [3].

Vortex rate gyroscopes use a concept similar to that of jet flow gyroscope. Such a vortex rate sensor contains a container in which a 2-D sink flow is generated. The generated sink flow uses a vortex whose pattern and streamlines are well-defined, by design, in the absence of input angular rate. However, when an angular rate is applied to the sensor, an additional vortex flow is superimposed on the initial sink flow, which leads to a combined vortex flow. The variation in the fluid streamlines indicates the magnitude and direction of the input rate. There are different designs that can achieve an operating sensor utilizing the vortex rate concept, such as in [10]-[18].

Integrating Angular Accelerometers, sometimes referred to as Fluid Rotor Angular Rate Sensors, are fluid-based angular rate sensors which operate using the law of conservation of angular momentum, i.e., Navier Stokes equations, and the continuity equations for viscous laminar Newtonian fluid flows. The typical internal structure of this kind of sensor includes an annular channel where fluid flows. The fluid flows under the impact of external angular motion. The annular channel is built such that it contains an obstruction or float. The obstruction/float is moved under the impact of fluid flow. The motion of the obstruction/float is an indication of external angular acceleration imparted to the sensor. The motion of such obstruction/float is sensed using bridge circuits or other equivalent pick-off mechanisms. However, the angular acceleration values are integrated by deploying a signal conditioning mechanism to measure an integrated angular acceleration sensor. In other words, the sensor measures the applied angular rate. There were numerous attempts at devices that used the same concept with different embodiments and modifications to achieve angular rate sensors. Among these attempts are a series of US patents that were mainly filed in the 1960s and the 1970s [19]-[23].

A micromachined biomimetic fluid rotor angular rate sensor was introduced by Andreou et al. in 2014 to be used for vestibular prostheses [24]. In this device, the sensor is used as a prostheses equipment that is utilized for people with a malfunctioning vestibular system. For clarity, the vestibular system is the part of the human body that is used to detect head motion in space. The vestibular system therefore has a crucial function for self-motion, body balance, adjusting body posture, and in helping stabilize vision during movement.

Fluid based inertial sensors have some advantages and some disadvantages when compared with other sensors discussed above. As noted previously, these fluid-based inertial sensors use fluid instead of a solid proof mass to detect inertial forces. Because of this, such fluid-based inertial sensors are advantageous in terms of having simpler structures and of being lower cost. In addition, these sensors have a high shock resistance and have large measurement ranges. However, when compared in terms of sensitivity and bandwidth, these fluid-based inertial sensors are not as desirable as MEMS-based inertial sensors [25].

Micro-machined fluid gyroscopes are based on either jet flow or thermal flow and are less mature than other types of gyroscopes. The jet flow gyroscopes use a laminar gas flow driven by a micro pump where an external rotational motion deviates the flow with an amount proportional to the angular rate by which the rotation was applied [25]. Micro-machined jet flow gyroscopes follow the same operational concepts as those for the previously mentioned jet flow gyroscopes, the only difference being the use of micro-machined structures in the micro-machined fluid gyroscopes. Conversely, thermal gas gyroscopes use a flow that is induced by thermal convection. Thermal gas gyroscopes apply the same concept used for the thermal accelerometers, where the thermal sensors are placed in a two-dimensional configuration to measure the rotational rates, instead of linear accelerations [25].

Fluid-based angular accelerometers share most of their technologies and operational concepts with fluid-based angular rate sensors. However, fluid-based angular accelerometers are different in that they lack the signal conditioning mechanism that integrates their output signal to result in an angular rate signal. Regardless of this, fluid-based angular accelerometers can be thought of as predecessors of fluid-based angular rate sensors in that fluid-based angular accelerometers were usually modified to produce fluid-based angular rate sensors. Consequently, fluid-based angular accelerometers technologies share most of its nomenclature with angular rate sensors technologies.

One of the first fluid-based angular accelerometer technologies is the fluid rotor angular accelerometer. Fluid rotor angular accelerometers are classified in literature into liquid rotor angular accelerometers and gas rotor angular accelerometers. Liquid rotor accelerometers can be further classified in terms of their motion pick-off mechanism. Liquid rotor angular accelerometers with electric pick-off mechanism were first introduced in 1957 by Statham laboratories in [26]. This was then followed by a modified design of a liquid rotor angular accelerometer with an electric pick-off mechanism reported by Morris et al. in 1970 in [27]. Similarly, liquid rotor angular accelerometers with a pressure sensing pick off mechanism were introduced by Amlie in 1964 in [28], and Schiltz in 1971 in [29]. Gas rotor angular accelerometers operated on a similar concept as that for liquid rotor angular accelerometers. One difference is that gas rotor angular accelerometers mainly utilized pressure-sensing pick-off mechanism and these were introduced by Thomson et al. in 1966 in [30], and Mac Donald in 1974 in [31].

With the revolution in the micromachining industries, micromachined and miniaturized versions of liquid rotor angular accelerometers emerged, such as the one reported by Wolfaardt and Heyns in 2008 [32]. Another version of such micromachined angular accelerometers was reported by Arms in 2003 in [33].

Another scientific concept that was used to realize fluid-based angular accelerometers is the heat-mass transfer of fluids. The concept was also utilized for manufacturing angular rate sensors, as stated above. Thermal flow angular accelerometers were reported initially by Benedetto and Linder in 1980 in [34].

In 2014, micromachined biomimetic versions of the thermal flow angular accelerometers were reported by a research group in the University of Twente in an attempt to use these sensors to provide low cost inertial sensors. The reported thermal flow used water as its fluid mass and used the thermal variations of the fluid flowing in annular channel to derive the angular acceleration imparted to the sensor through solving the Navier-Stoke equations. However, the reported sensor provided poor performance and, as such, the reported sensor could not be used for vestibular prostheses.

The same research group, at the University of Twente, reported a micromachined biomimetic MHD flow angular accelerometers in 2008. These accelerometers were also intended to be low-cost sensors and utilized tap water and salt water solutions as a fluid mass flowing in a microfluidic annular flow channel. The flow was induced when the sensor is subjected to angular motion and the flow was detected and measured utilizing the MHD effect. However, the sensors also reported poor performance.

Other sensors that have been used to determine measurements relating to direction and motion include rate-integrating gyroscopes. These rate-integrating gyroscopes include various typical error processes in their output. Such error processes include: g-insensitive biases, g-sensitive biases, an-isoelastic biases, scale-factor errors, cross-coupling errors, and zero-mean random biases. Each error process has its own sources, and these are discussed thoroughly in [3]. Rate integrating gyroscopes are characterized mainly by being relatively more sensitive to linear and angular accelerations and platform vibrations. In addition, the electromagnetic pick-off elements and torque motor of this type of gyroscope are prone to deviations from external magnetic fields. Hence, rate integrating gyroscopes demand proper magnetic shielding to prevent such errors from occurring. Additionally, rate-integrating gyroscopes are highly affected by temperature variations which lead to variations in the magnetic properties of the magnetic materials within the sensor. Such variations lead to first, second, and third order scale-factor errors [3].

Magnetohydrodynamic angular rate sensors require proper magnetic shielding for the indication component to ensure proper rate measurement. Otherwise, the sensors suffer from high bias instability due to its dependency on the magnetohydrodynamic effect.

Fluid rotor angular rate sensors suffer from low bandwidth and low dynamic range when compared to other angular rate sensors. In the early developments for this kind of sensor, the major problems included achieving adequate stability, resolution, and insensitivity to environmental impacts, especially temperature variations. Consequently, the fluid-based sensors of this form were not considered a plausible sensor to be used for navigation applications.

Micromachined fluid-based gyroscopes suffer from drift due to improper thermal compensation and its vulnerability to variations in ambient temperature. Furthermore, micromachined fluid-based sensors suffer from low bandwidth and low sensitivity. Moreover, the main research aspects to be considered, for micro-machined inertial sensors, are enhancing the temperature compensation, the full development of a monolithic IMU, and reducing cross-coupling errors [25].

Angular accelerometers are mathematically incompetent relative to angular rate sensors. The reason lies within the mathematical integration process that is required to retrieve the attitude parameters of a moving platform. Such an integration process over time only occurs once for angular rate sensors while this integration process occurs twice for angular accelerometers. Typically, the integration of the sensor output signal over time acts as a low-pass filter and this eliminates short-term errors such as white noise within the sensor measurements. However, the integration cannot handle nor eliminate long-term errors, such as the bias-instability or in-run variations within a sensor output signal. Consequently, it is preferable to implement the integration process as minimally as possible to evade the long-term error accumulation within the derived quantities. Moreover, numerical integration truncation errors also occur due to digital signal acquisition from modern sensors.

However, what makes most angular accelerometers unsuitable for inertial navigation applications is an inherited error within all angular accelerometers, known as the threshold error. The threshold is the least angular acceleration value that the sensor can detect under normal operating conditions. The threshold error is defined as the drift that occurs in the computed attitude angle, which occurs when the angular accelerometer is subjected to an angular acceleration value lower than the sensor threshold value. Consequently, an angular accelerometer subjected to an angular rotational motion, about its sensitive axis, with an angular acceleration value lower than the threshold, would result in a drift angle that takes a quadratic form as a function of time, due to the integration process. Similarly, while the angular rate sensors might suffer from the same error, the resulting drift angle would drift linearly with time [35].

It should, however, be clear that, as noted above, angular accelerometers are of low performance in comparison to angular rate sensors, especially for navigation applications. Regardless of this known fact, some fluid-based technologies that are utilized in the manufacture of the angular rate accelerometers are prone to errors that further degrade the performance of such sensors. The main drawback of liquid rotor angular accelerometers is the occurrence of non-linear responses due to changes in temperature and thermal gradients across the sensor. The changes in ambient temperature can be compensated for using volume compensators. However, the sensors should be carefully designed and provided with proper thermal shielding to avoid such effects. In addition, some designs are sensitive to linear accelerations which induce errors in the measured angular accelerations. Similarly, the gas rotor angular accelerometers suffer from temperatures gradients across the sensor. Furthermore, proper shielding for the electronic components is required to avoid stray capacitances that affect the output signals.

To sum up, regardless of the technology used to build the inertial sensor, high bias instability is a characteristic of all low-cost inertial measurement units due to mechanical fabrication imperfections, poor electric pick-off mechanisms, errors because of analog to digital signal converters for mechanical sensors, or thermal drift. Additionally, low cost IMUs are characterized by a low signal to noise ratio. On the other hand, high performance inertial sensors are typically expensive and are also subject to bias instability in their output.

Based on the above, there is therefore a need for systems and methods that mitigate, if not overcome, the shortcomings of the prior art.

SUMMARY

The present invention provides systems and methods related to gyroscope related applications. A platform having at least one torus shaped channel that is filled with a liquid is used in conjunction with at least one marker to determine the direction of forces applied to the platform. Each marker is neutrally buoyant within the liquid and a marker tracking system is used to determine the displacement of the marker from its resting place after a force has been applied to the platform. The tracking system may be based on one or more digital cameras in conjunction with suitable image processing software to determine each marker's position before, during, and after the force has been applied. A gyroscope can be constructed using three such platforms with each platform being orthogonal to the other two. Each platform may have multiple concentric channels with a common center with each channel having a different sensitivity to the applied forces.

In a first aspect, the present invention provides an assembly for use in gyroscope applications, the assembly comprising:
　a planar platform comprising at least one torus-shaped, liquid filled channel containing at least one marker, said at least one marker being displaced from its resting position by forces applied to said platform;
　a marker tracking subsystem for determining an amount of displacement of said at least one marker from a resting position of said at least one marker whenever said at least one marker is displaced by said forces;
　wherein
　said at least one marker is neutrally buoyant in said liquid filling said channel.

In a second aspect, the present invention provides a gyroscope comprising:
　three assemblies for determining directions of forces applied to said gyroscope, each assembly being configured to determine forces applied relative to a specific plane;
　wherein
　　each assembly comprises:
　　　a planar platform comprising at least one torus-shaped, liquid filled channel containing at least one marker, said at least one marker being displaced from its resting position by forces applied to said platform;
　　　a marker tracking subsystem for determining an amount of displacement of said at least one marker from its resting position whenever said at least one marker is displaced by said forces;
　　　wherein
　　　said at least one marker is neutrally buoyant in said liquid filling said channel;
　　　a plane for each platform is orthogonal to planes for other platforms.

In a further aspect, the present invention provides a method for determining forces applied to a gyroscope, the gyroscope comprising a torus-shaped channel containing at least one particle, the method comprising:
　a) acquiring a first image of said at least one particle in said channel prior to an application of a force to said gyroscope;
　b) acquiring at least one second image for said at least one particle in said channel after said force has been applied to said gyroscope;
　c) determining a centroid for said at least one particle in said first and said at least one second images;
　d) determining an amount of movement of said at least one particle relative to a position of said particle in said first image, said amount of movement being proportional to said force applied to said gyroscope;
　wherein said amount of movement is determined by an angle between a first vector and at least one second vector, said first vector being from a center of said torus of said torus-shaped channel and a position of said at least one particle in said first image and said at least one second vector being from said center of said torus of said torus-shaped channel and a position of said at least one particle in said at least one second image.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
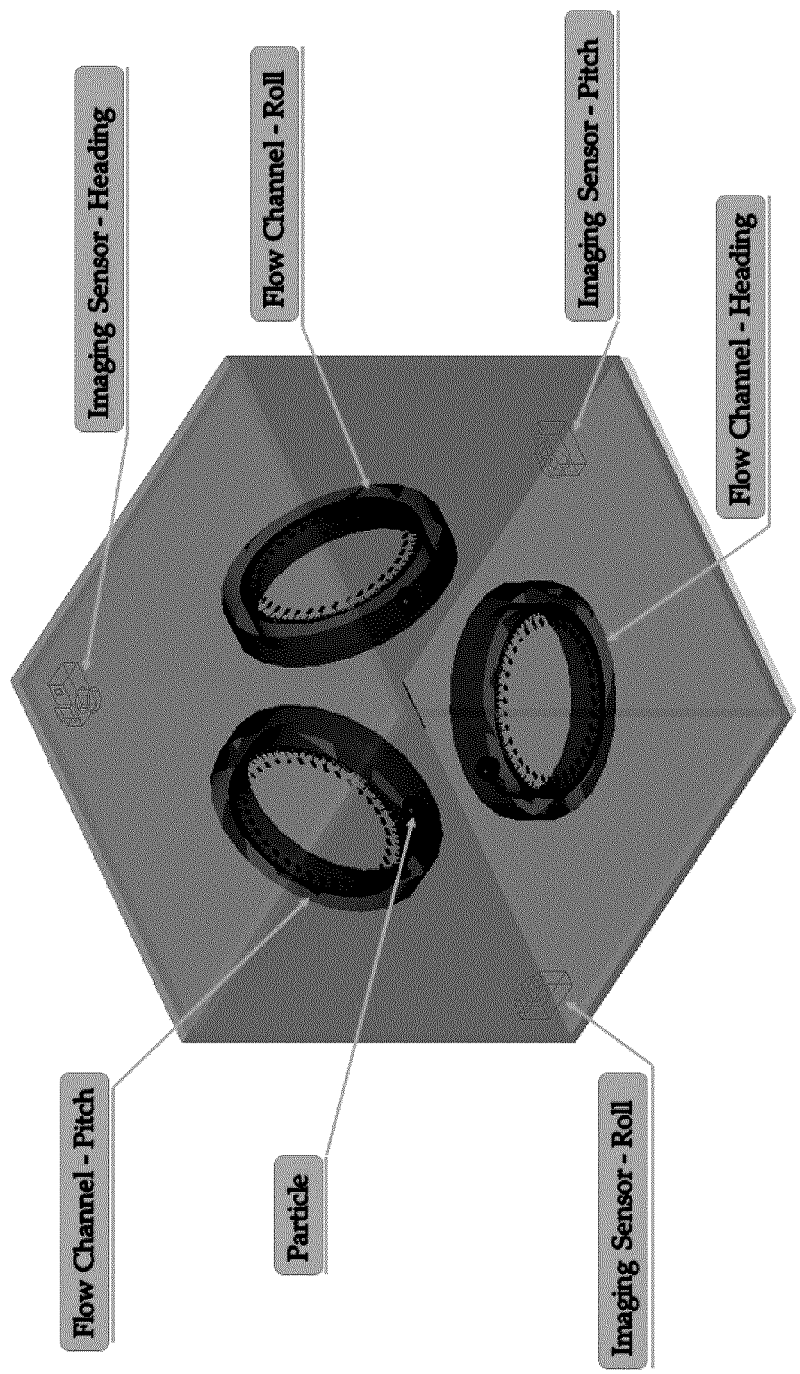
FIG. 1 is a schematic that illustrates one aspect of the present invention.

To better understand the present invention, the reader is directed to the listing of citations at the end of this description. For ease of reference, these citations and references have been referred to by their listing number throughout this document. The contents of the citations in the list at the end of this description are hereby incorporated by reference herein in their entirety.

One objective of the present invention is to reduce drift rate and long-term errors encountered in low cost inertial sensors. To be specific, all inertial sensors suffer from a drift rate that occurs due to various reasons, regardless of the IMU grade or cost. One objective of the current invention is to provide a nearly drift-free gyroscope that provides a drift rate values less than listed values for strategic grade IMUs.

Another objective of the present invention is to eliminate errors that typically occur in the analog to digital conversion process that takes place in any IMU, such as quantization errors. In one aspect, the present invention does not require signal conditioning to derive the measured angular rate from another measured quantity, such as deriving the angular rate from a measured D.C. voltage, as is the case in most inertial sensors.

Yet a further objective of the present invention is that of providing an output with a relatively high signal to noise ratio (SNR) when compared with IMUs that are suited for navigation and stabilization applications.

It should be clear that, with fluid-based inertial sensors, system temperature extremely affects the sensors performance. Consequently, it is considered an objective of the current invention to provide a gyroscope that does not include moving parts except for a number of particles or markers which do not cause variations in the temperature of the system and maintains constant temperature throughout the operation of the sensor, provided that the system assembly is provided with proper shielding from ambient temperature. Additionally, the present invention provides a design that is not affected by the variations in the magnetic fields within the environment in which the sensor is operated.

As stated earlier, the cost of an IMU is dependent on the technology and on the performance of the IMU such that the cost increases as the IMU performance gets better. The present invention provides an IMU that is of relatively low cost when compared with typical IMUs that share the same performance and characteristics.

Additionally, another objective of the present invention is to provide a gyroscope that is compact enough to be used for typical navigation applications. The design of one aspect of the present invention provides a gyroscope that can be mounted for typical navigation platforms, especially in terms of size. These typical platforms include ground-based, aerial, and marine platforms. This aspect of the present invention provides a simple structure that does not require special precautions or procedures in the sensor fabrication and in operation processes.

Operational Concept

In one aspect, the present invention provides a fluid-based gyroscope that depends on fluid dynamics to provide the inertial measurements. The concept is that when an inertial force is imposed upon a control volume of fluid, a flow is generated in response to such force to satisfy Newton's second law of motion. Hence, once the flow can be detected, and through the implementation of fluid dynamics theories, the actual inertial measurement can be determined. The fluid dynamics theories, which are of interest when designing this system, are the law of conservation of momentum implemented for incompressible fluids (or alternatively referred to as Navier-Stokes equations) and the continuity equation for incompressible fluids. The concept is applicable for either linear or rotational types of motion. However, the present invention is used in the detection and measurement of rotational motion.

The present invention employs a version of particle imaging velocimetry to perform the inertial measurements. Particle Imaging Velocimetry is a branch of fluid dynamics science in which the properties of fluids and fluid flows can be determined through the tracking of particles that are neutrally buoyant and which mimic the actual dynamics of the flow. Particle imaging velocimetry implies the use of one or more imaging sensors (or other imaging or tracking means) that are used to track the particles. Such imaging or tracking sensors may be set up in fixed or moving positions along the examined flow. Research has been extensive in particle imaging velocimetry with vast technical advancements in digital image processing to acquire more precise measurements, computationally efficient processes, and high rates of data acquisition.

In this aspect of the present invention, one or more particles or markers are monitored within a predefined control volume flow channel and the particle monitoring is performed using one or more fixed imaging sensor with respect to the pre-located and fixed flow channel. The motion of each particle is determined from the acquired sequence of images via a series of digital image processing techniques.

To lay down a basis for the particle tracking, the projectivity condition is implemented to determine the relative position of each particle with respect to the image space coordinate system. It is noted that the image space represents a constant view of the flow channel in which the at least one particle is only in motion as result of the fluid flow. Since the object space geometry is known, the use of a single imaging sensor can determine the object space position of any point that is an element of the image space view. Consequently, the position of the particle can be determined directly. It should, however, be clear that multiple imaging sensors can be utilized to enhance the accuracy of the particle tracking.

Sensor Design

The adopted design of one aspect of the present invention uses an open loop design where the sensor performs the measurement without the need for an external restoring mechanism that restores the sensing element to its original state. The sensing element within gyroscope is designed such that the sensing element assumes its original position after each measurement on its own as per the proper damping mechanism provided within the design of the present invention.

Sensor Internal Structure and Components Description

Any inertial measurement sensor constitutes three main components that are crucial for it to perform the inertial measurement. The components are the motion transduction mechanism, the signal conditioning component, and the sensor readout component. The motion transduction mechanism comprises the sensing element, which is sensitive to the applied external motion to the sensor, and a damping mechanism that eliminates the effects of oscillations and disturbances that occur whenever the external stimulus is unapplied to (or removed from) the sensor. The efficiency of any given damping mechanism is measured by the amount of time required for the sensing element to stabilize after an external disturbing force is removed. The damping mechanism is the mechanism responsible for restoring the sensing element to its stable state, i.e., the state that the sensing element presumes when the sensing element is stationary. For closed-loop sensors, the damping mechanism takes the form of an external input means that applies or couples an appropriate form of restoring force to the sensing element. However, for open-loop sensors, the damping mechanism relies on the physical properties and the system design to apply the proper damping forces/torque required to stabilize the system.

The signal conditioning component is used to apply a modification or adjustment for the signal acquired using the motion transducer and is used to generate a proper output signal for the readout mechanism. The signal conditioning phase might include applying basic operations to the signal such a filtering, integration, or differentiation. For some sensors, signal conditioning is applied to increase the amplitude or to increase the power of the signal to thereby be able to drive the readout component.

The readout component is a mechanism that transforms the signal into a comprehensible form of information that can be understood by human recognition or into a form that can be fed into a controller for mechanical instruments and applications. Hence, any sensor must include a readout mechanism. The readout mechanism for an inertial sensor is usually fed into a controller that can be either used for machine control, platform stabilization, or navigation.

Motion Indicator

In one aspect of the present invention, the system uses three fluid flow channels placed in 3 mutually orthogonal axes, with at least one camera facing each flow channel to track one or more particles or markers that are placed in each flow channel. The particles or markers are chosen to be of the same density of the fluid filling up the flow channels so that the particles are neutrally buoyant. In one aspect of the present invention, the design represents a 3-axis gyroscope. However, this design can be reduced to a single axis gyroscope. FIG. 1 is a schematic that illustrates the system design and structure.

As can be seen from FIG. 1, the system takes the form of a cuboid, where there is a flow channel in the shape of a circular torus fixed on each face. There is at least one imaging sensor facing each flow channel to capture the motion of the particles within each flow channel. In one implementation, the at least one imaging sensor is a digital camera.

Figure 2:
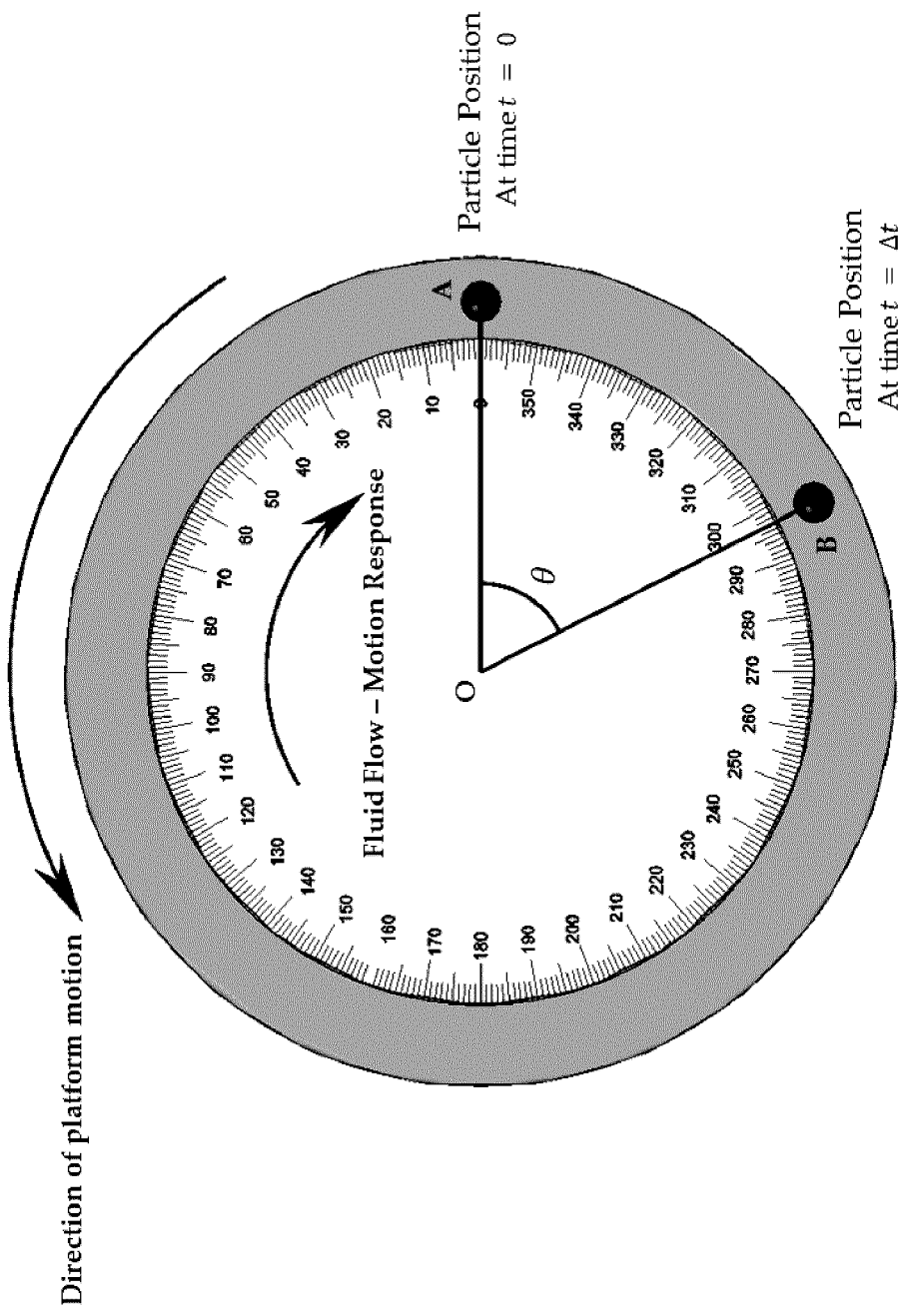
FIG. 2 is an illustration detailing one concept used by the present invention.

Once the cuboid is mounted on a moving platform, the imaging sensors will capture the motion of the particles through the circular flow channels. The acquired images are then processed to determine the location of the particle. Afterwards, the location of the particles within each image is compared with their initial locations before the motion occurred. To illustrate, the vector $\overrightarrow{OA}$ connecting initial location of one particle to the center of the circular flow channel is calculated, as shown in FIG. 2. Accordingly, the vector $\overrightarrow{OB}$ connecting the location of the particle at any given instant to the center of the circular flow channel is calculated as well.

The angle defined by those vectors is computed through implementing equation (1) As can be seen, this equation is the difference between the slopes of the two vectors $\overrightarrow{OA}$ and $\overrightarrow{OB}$. The computed angle ($\theta$) is proportional to the angular rate of the rotation of the device, and hence, the angular rate of the moving platform.

$$\theta = \tan^{-1}\left(\frac{Y_B - Y_O}{X_B - X_O}\right) - \tan^{-1}\left(\frac{Y_A - Y_O}{X_A - X_O}\right) \quad (1)$$

In Equation (1), $(X_O, Y_O)$ are the coordinates of the center of the circular flow channel, $(X_A, Y_A)$ are the coordinates of the initial particle position, and $(X_B, Y_B)$ are the coordinates of the particle position.

Damping Mechanism

As noted above, the gyroscope of the present invention is an open-loop sensor. Hence, the damping force is applied without the need for any external feedback system to apply the damping effect. The damping effect is applied through the viscous drag force that is created upon the particle. This is a result of the fluid viscosity and the friction between the fluid layers with the walls of the toroidal pipe and with the particle itself. Moreover, the proper damping effect, i.e., the damping time, can be adjusted by manipulating the system design components as discussed below.

When the gyroscope of the present invention is operated, and as soon as the external applied angular rate is removed, the viscous drag forces the particle to return to its initial stable position, i.e., the particle's position before the angular rate was applied. However, it should be noted the design can be adjusted to reach the required damping effect. The damping effect can be described in terms of the precision of the particle to return to its stable position and the amount of time that the particle takes to restore its stable position. The proper damping effect implies a high accuracy of position restoration and the least amount of time for the particle to reach stability.

Signal Conditioning

One of the main advantages of the gyroscope of the present invention is that the sensor does not require any signal conditioning. The sensor does not require any additional hardware to modify the acquired signal. Rather, the signal is directly transmitted to the readout component.

Read-Out/Pick-Off Mechanism

For the present invention, the readout mechanism can be any electronic processing unit that can acquire the output of the utilized imaging sensors. The electronic processing unit is used to implement the image processing algorithms to acquire the position of each particle within its respective flow channel. The time series of each particle position is directly the output signal that can be used as an indication for the angular rate after, of course, applying any suitable proper signal calibration.

Temperature-Pressure Stabilization Means

The performance of the present invention's gyroscope depends on temperature and pressure stability since the driving and damping forces are governed by the fluid. Consequently, the performance of the present invention depends on ensuring that the fluid's properties are constant while the gyroscope is in operation. It would therefore be preferable that the system include means for stabilizing the temperature and the pressure of the fluid control volume. A well-sealed fluid torus compartment would ensure a constant fluid pressure (i.e. would provide pressure stability) for the system.

Design Parameters

The system design considers a set of design aspects for each system component. The design aspects are chosen based on the system components, and the fluid dynamics within the chosen control volume for the fluid. These design aspects are inter-related and should be addressed holistically. These are discussed below.

Sensing Mechanism-Imaging Sensors

For the current embodiment of the invention, a number of imaging sensors are used to acquire the output signal for the sensor. Part of the design specifications for the present invention is a set of specifications for the imaging sensors that can be used to detect the inertial motion of the particles. Such specifications should include the field of view (F.o.V), focal length, whether the lenses are variable or moving, spatial resolution, and temporal resolution.

However, it should be clear that any optoelectronic sensor can be used instead of typical imaging sensors to ensure a smaller size, and higher data rate. Optoelectronic sensors are any sensors that are used to detect intensity and position of light wave. In one implementation of the present invention, the optoelectronic sensor used is a digital camera.

Flow Channel Design

The flow channel was chosen to be in the form of a circular torus, as illustrated in FIG. 1. The flow channel, being in the form of a circular torus, is analogous to the flow of the endolymph (i.e. a solution of sodium) within the vestibular system of a human being. The justification for such shape for the flow channel is to ensure that the system is insensitive to linear accelerations as these are cancelled out due to the circular torus design of the flow channel.

For one implementation, the flow channel is preferably clear and transparent to cooperate with the chosen sensing mechanism (i.e. digital cameras). The design considerations for the flow channel preferably include the overall diameter of the torus and its cross-sectional area. The dimensions of the circular torus pipe should follow the limits of the Reynold's number to ensure a laminar flow. Reynold's number is a unitless quantity that represents, in its abstract sense, the ratio between the inertial forces with respect to the viscous force acting upon a fluid flow. The formula to compute Reynold's number ($R_e$) is given by Equation (2), and the upper state for laminar flow is achieved at Reynolds number values less than 200.

$$R_e = \frac{\rho v d}{\mu} \quad (2)$$

In Equation (2), (ρ) is the fluid's density, (v) is the velocity of the flow, (d) is the cross-sectional diagonal dimension, and (μ) is the fluid's dynamic viscosity.

The flow channel design controls, to a certain extent, the damping effect that is applied to the particle(s). Hence, the cross-sectional area and length of the flow channel are of some importance to the amount of momentum that the fluid is going to have, and hence to the amount of force imparted to the particle(s). This, of course, determines how far the particle(s) would flow within the channel. On the other hand, such force is balanced with the viscous drag force of the fluid. It should be clear that the fluid channel cross-section can be increased or decreased along a certain length of its total length to ensure that the proper damping effect is applied, and that the gyroscope is calibrated in terms of the output angular rate signal.

Fluid Specifications

The fluid that represents the inertial measurement medium for the system of the present invention should be addressed within the design phase. Hence, the fluid properties, and, more specifically, its density and viscosity, can be considered as being part of the design of the present invention. The reason behind addressing the fluid properties is that the chosen fluid would define a set of defining parameters for the system performance, among of which are the sensitivity and the dynamic range of the resulting device. Moreover, the effect of temperature and pressure upon the fluid properties is another aspect that should be considered.

It should, of course, be clear that the concept and scientific basis for the present invention is based on a set of assumptions for the fluid and its flow nature. The fluid is assumed to be a Newtonian fluid and is assumed to be viscous. It is also assumed that the fluid's flow is always be maintained to be incompressible and laminar.

The chosen fluid has a large impact on the application of a proper damping effect upon the particle. To be specific, the kinematic viscosity of the fluid is important to determine the amount of viscous drag that would be imparted to the particle(s), and subsequently, to the damping time and the damping magnitude. The kinematic viscosity for a fluid is defined as the ratio, at a specific temperature, between the fluid's dynamic viscosity to its density. It is therefore possible to adjust/vary the fluid used to arrive at a desired sensitivity and to result in suitable damping properties for the resulting system.

Particle Design

As noted above, it is preferable that the material of the particle to be tracked be of the same density of the fluid to ensure the particle's neutral buoyancy. Preferably, the shape of said particle, as well as its dimensions, should be defined in conjunction with the chosen design for the flow channel.

For one implementation of the present invention, the particle shape is chosen to be spherical, such that particle provides a nearly neutral effect upon the driving and the damping forces. This allows the system response to be controlled through the fluid properties and the chosen geometry for the control volume (i.e. in this implementation, the geometry was selected as being a torus).

Preferably, the dimensions of the particle ensure that the particle lies at the point of maximum velocity within the velocity gradient of cross-section of the flow channel. At the same time, it is preferred that the dimensions be such that the particle does not block the fluid flow in the channel.

In addition to the above, it is preferred that the dimensions (i.e. the size) of the particle be chosen such that the particle can be represented and detected within an image as per the spatial resolution of the deployed imaging sensors. The precision of the detection of the centroid of the particle within any given image may affect the measurement precision of the system as a whole. Hence, as the particle size increases, the uncertainty in the detection of the centroid of the particle decreases accordingly. Therefore, it would be prudent to consider that the choice of an appropriate size for the particle be a balance between being apparent in the image space and being as small as possible to minimize its effect upon the fluid flow.

Moreover, the shape and size of the particle determines, in conjunction with the fluid flow channel design and the type of fluid, the amount of damping force that can be applied to the particle. The size of the particle is preferably selected such that the ratio between the cross-sectional area of the particle to the cross-sectional area of the fluid flow channel is optimized to obtain the desired damping effect. Additionally, it should be clear that the shape of the particle is also a factor in defining the viscous drag force created upon the particle when interacting with the fluid layers. The viscous drag force is factored by the impact of the shape of the particle around which the fluid is flowing. The shape of the particle is preferably selected to optimize the damping effect within the system as a whole.

Digital Image Processing

Digital image processing is used to produce useful results from one implementation of the present invention. The precision by which the chosen digital image processing algorithm can determine the centroid of the particle defines different system performance parameters including the signal-to-noise ratio (SNR) and the angular random walk.

Figure 3:
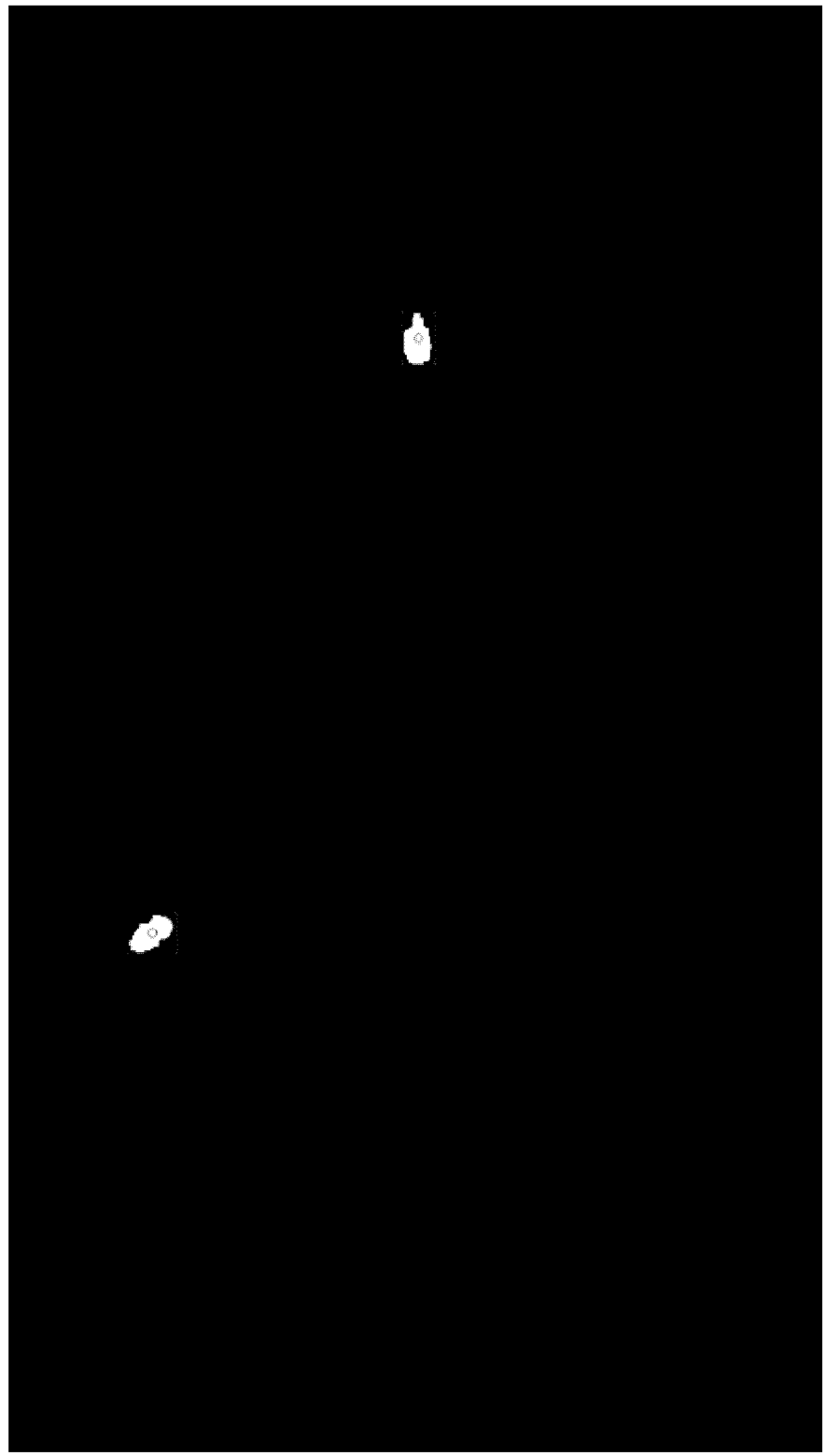
FIG. 3 is a sample image as used by an image processing portion of one aspect of the present invention.

The selected digital image processing algorithm includes two sequential phases. The initial phase is motion detection of the particle. The initial phase is based on the image-space view being constant and still with the particle moving when there is external motion. This means that the initial phase implies a computation of the sum of absolute differences of any given image during system operation with respect to the initial image. Thus, the approximate location of the particle, at the initial and current epochs, within the vicinity of the image space can be determined by setting a threshold and creating a binary image based on such a threshold. The particle locations would appear as white blobs within the black background of the binary image. FIG. 3 shows a sample figure of the output of the initial phase. The centroid of each blob is acquired easily by applying binary image labeling.

The second phase is based on the output of the initial phase such that the computed centroid is used to create a region around the centroid with the dimensions of the bounding box for the blob, as depicted in FIG. 3. This region is used as a sub-image for further processing. Initially, the RGB values within that region is compared to a predefined reference RGB value where the reference RGB value is based on the color of the used particle. Once the region satisfies this condition, edge detection is implemented to define the outer edge of the particle. The outer edge is fitted to the actual geometric shape of the particle using least squares adjustment. Finally, a more precise centroid is computed for the particle. The algorithm is repeated for each acquired image.

As explained above, the angle defined by the vector connecting the current particle position and the center of the circular torus projection within the image and the vector connecting the initial particle position and the center of the circular torus projection within the image space, can be computed.

Implementation Details

Provided below are the implementation details according to one aspect of the present invention. As can be imagined, these details are not to be taken as limiting the scope of the present invention. Other variants are possible and such variants may be formulated by optimizing the implementation based on optimizing sensor design, cost, structure simplicity, size, and performance. In this implementation, the present invention takes the form of a triaxial gyroscopic assembly, which can be adapted to a single axis as necessary. This implementation is easily adaptable for inertial navigation applications.

Figure 4A:
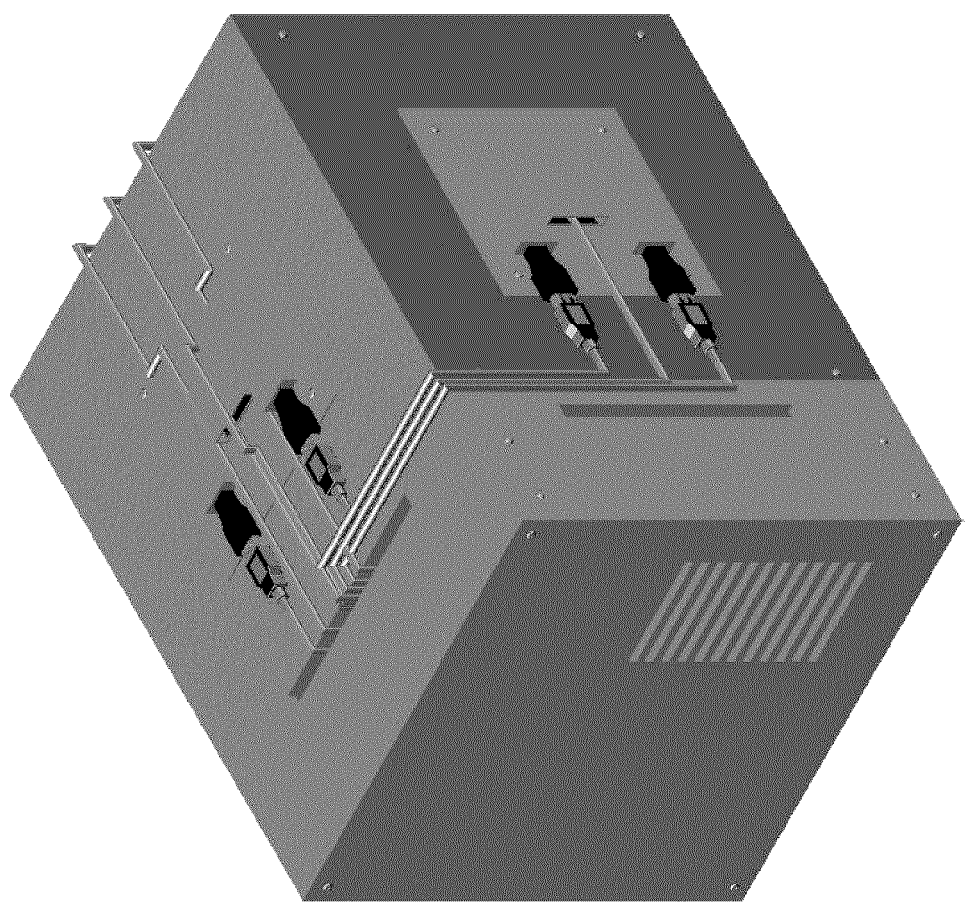
FIGS. 4A and 4B show 3D perspective views of one implementation of the present invention.
Figure 4B:
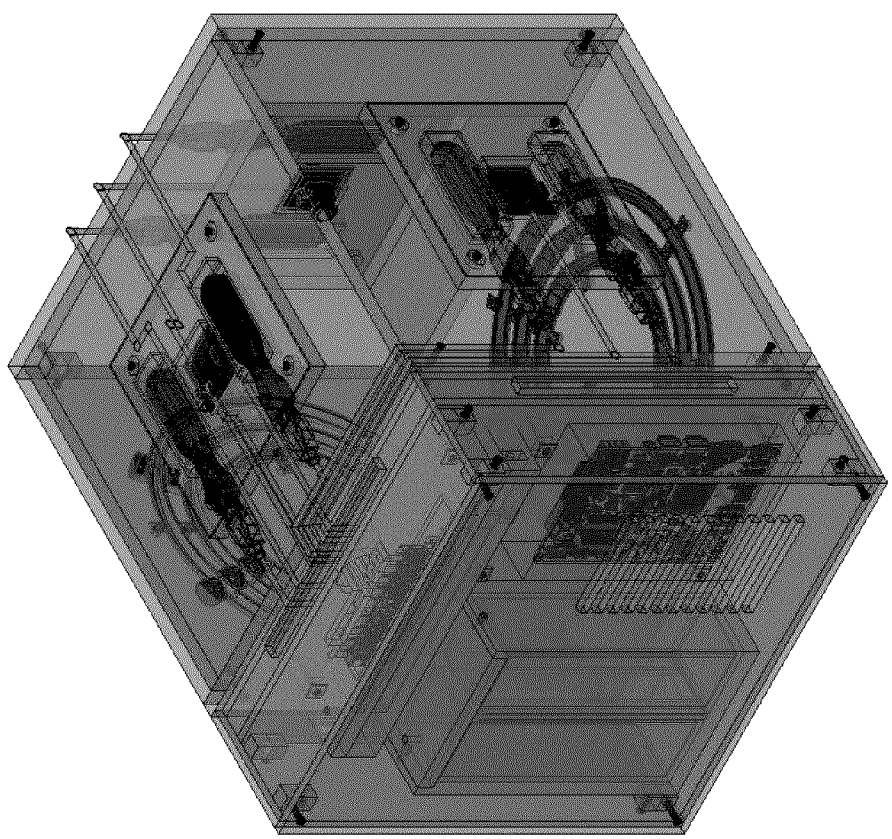
Figure 5A:
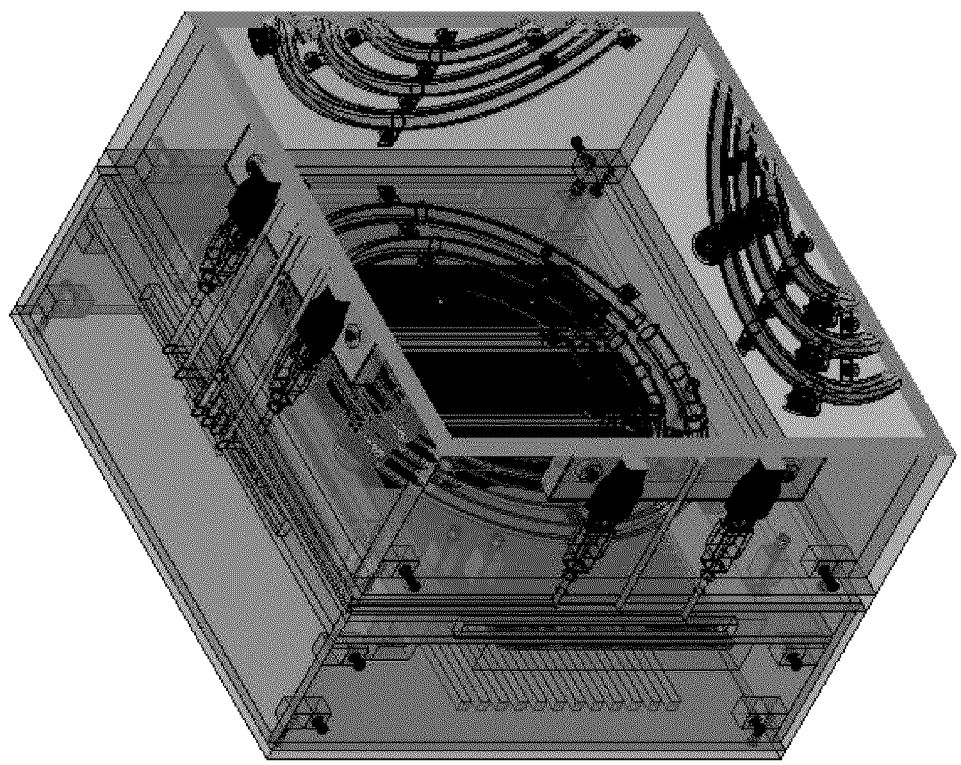
FIGS. 5A and 5B show cut-away perspective and elevation section views of one implementation of the present invention.
Figure 5B:
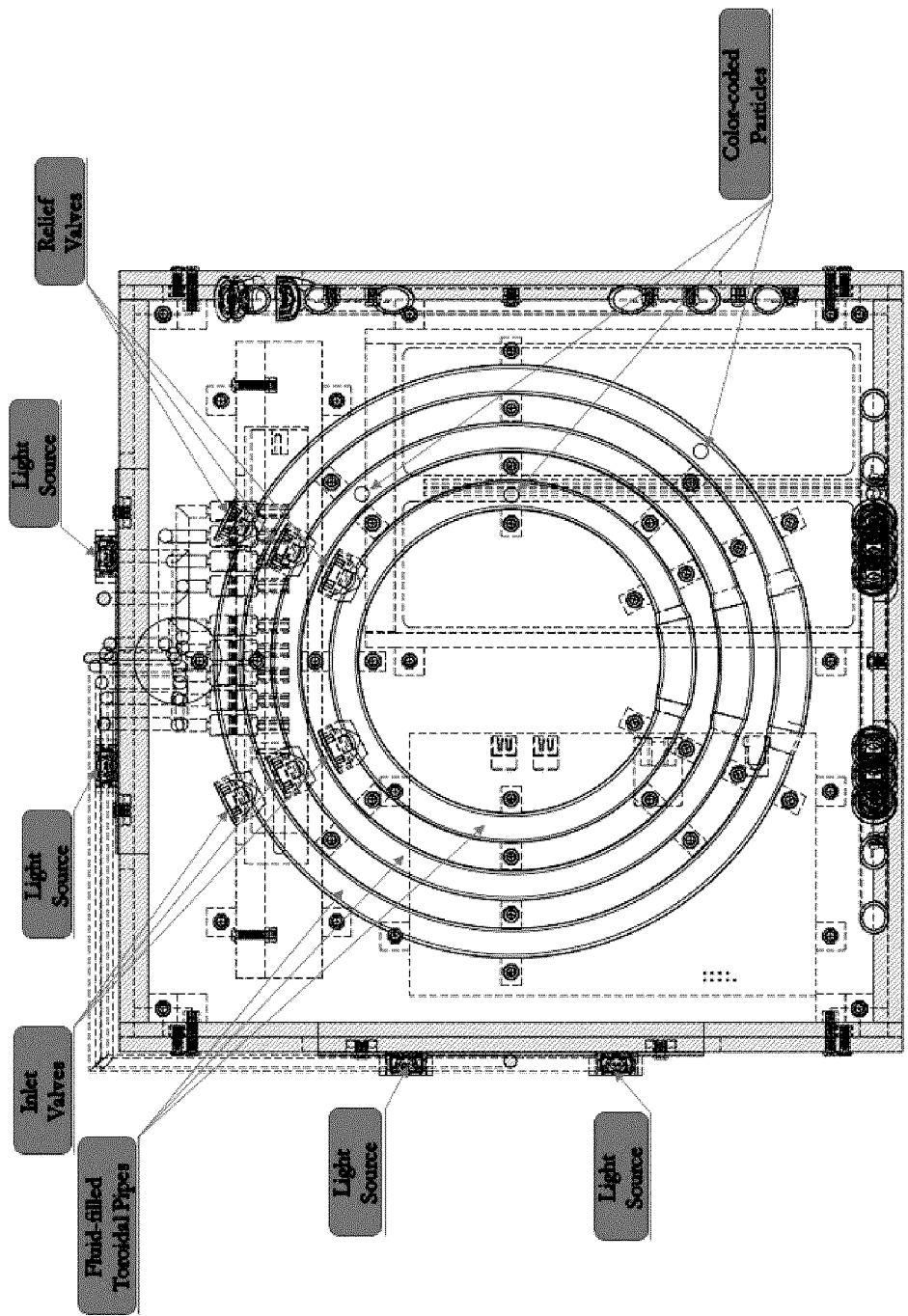
Figure 6A:
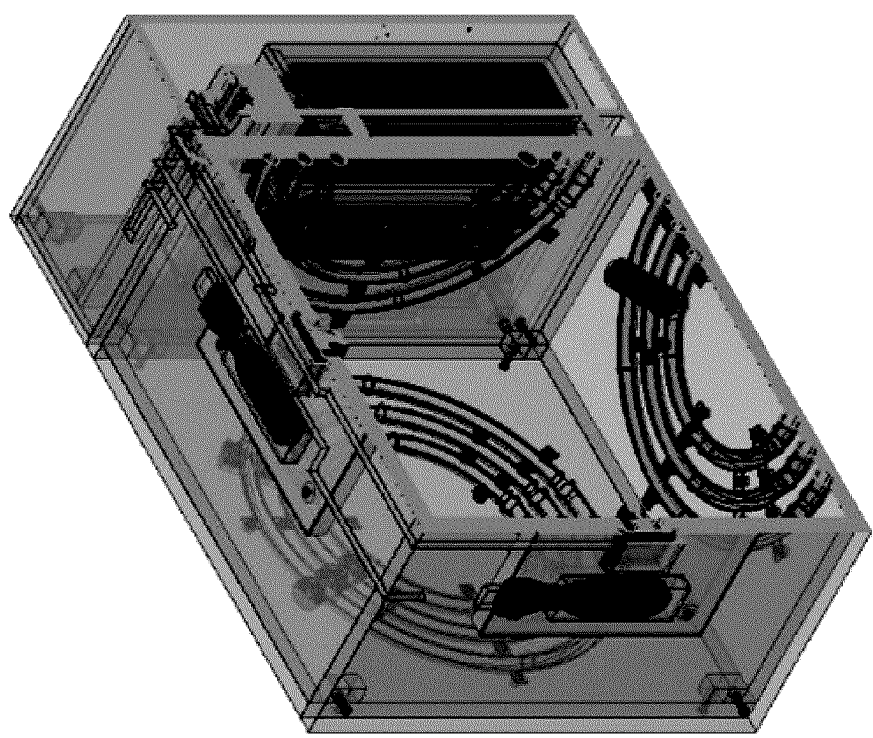
FIGS. 6A and 6B show a side cut-away section and side section view of a gyroscope according to one aspect of the present invention.
Figure 6B:
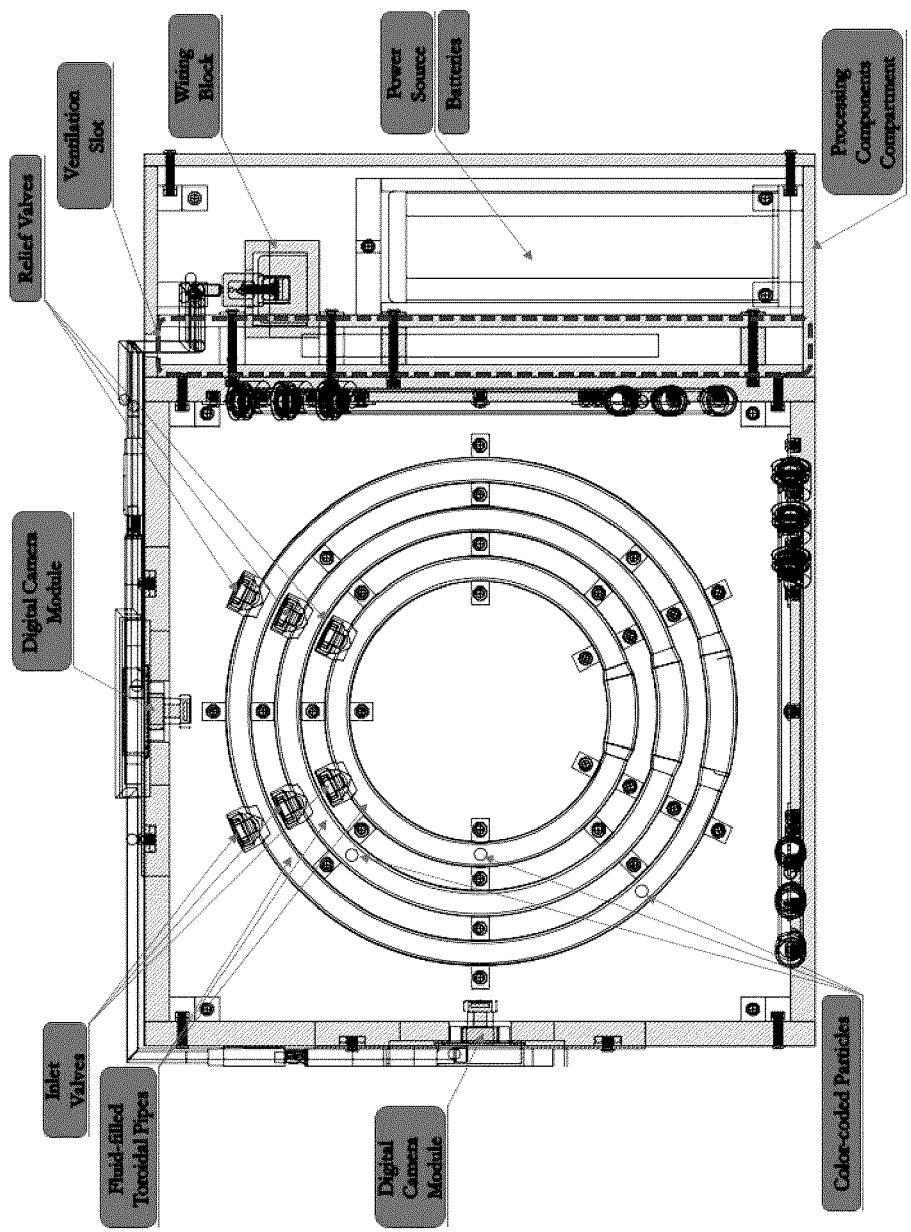
Figure 7A:
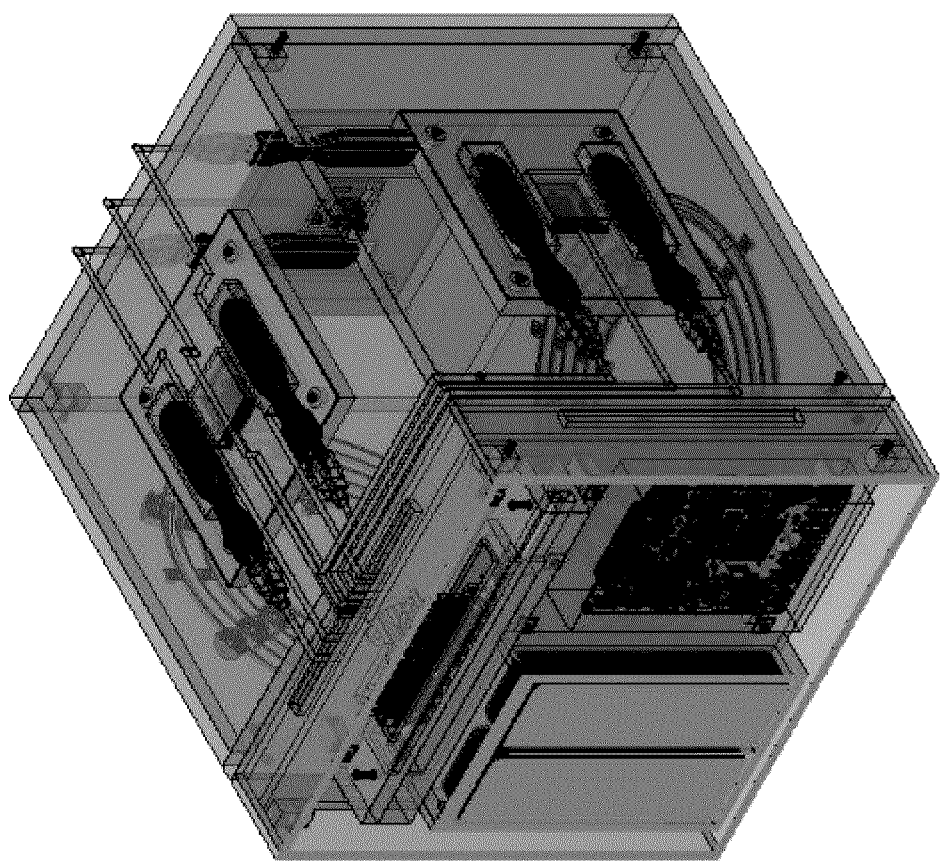
FIGS. 7A and 7B show a back-perspective view and a back section of the gyroscope illustrated in FIGS. 6A and 6B.
Figure 7B:
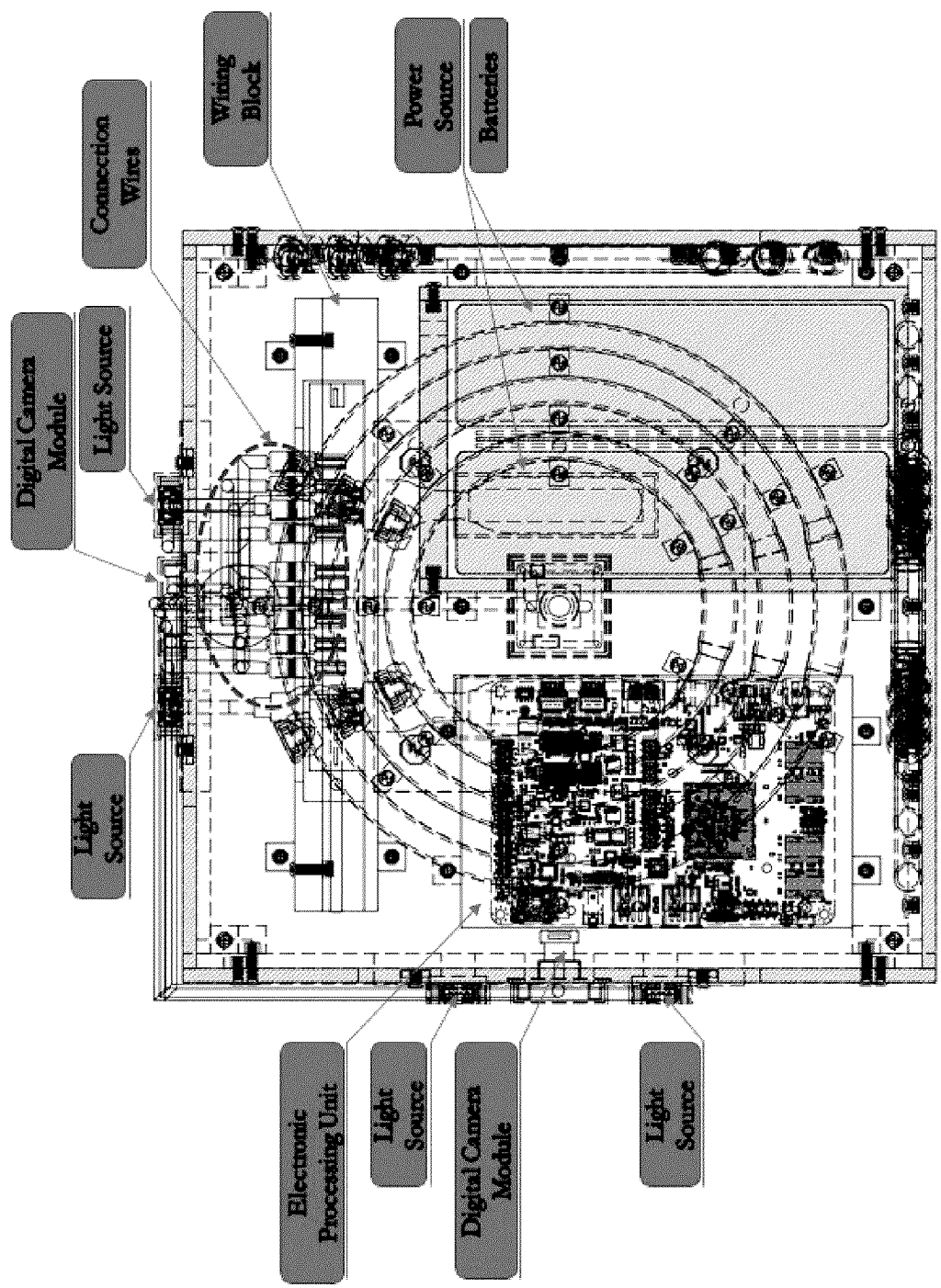

FIGS. 4A and 4B show a 3D perspective view of this implementation of the present invention, along with a section view of some parts, to provide an insight on the gyroscope in its final form. FIGS. 5A and 5B show a cut-away perspective view and an elevation section through the completed gyroscope according to one aspect of the present invention. FIGS. 6A and 6B show a side cut-away section and a side section view of the completed gyroscope according to one aspect of the present invention. FIGS. 7A and 7B show a back-perspective view and a back section through the completed gyroscope according to one aspect of the present invention.

As shown in the above noted Figures, the gyroscope according to one aspect of the present invention uses a set of three perpendicular planes or platforms that have been assembled into the form of a cube. Each plane or platform has a set of three concentric fluid flow toroidal channels. The fluid flow channels are made of transparent material such as glass, acrylic, or any equivalent material that ensures transparency and sufficient material strength to resist vibrations and shocks. Additionally, the material preferably allows manufacturing tolerances that ensure the fluid flow channel can be hermetically sealed to preserve constant pressure for the contained fluid. Each fluid flow channel has a fitted valve that is used for filling the channel with fluid and this valve also acts as an entry passage way for the particle. As noted above, each flow channel is filled with a fluid that is chosen to optimize the performance of the resulting system. At least one color-coded spherical particle or marker is inserted within each fluid flow channel with the particle being neutrally buoyant and having specific known dimensions. The material of each particle is chosen such that particle manufacturing process ensures a smooth surface for the particle to thereby minimize the chance of creating micro turbulences around the particle. Such turbulences may affect the particle motion within the channel. The particles or markers are color-coded to facilitate the efficacy of the digital image processing phase.

Regarding the driving liquid or fluid, this fluid preferably has a density that is equivalent to the density of the particle(s) such that the particle(s) is/are naturally buoyant in the fluid. In one experimental set up, the fluid was a salt-water solution with a concentration of 200 g/l. The marker or particle used in the experimental set up was a hollow ABS plastic sphere with a nominal diameter of 3 mm. It should, however, be clear that the fluid and the marker may have any suitable composition as long as the fluid and the marker have the desired properties explained and described herein.

The rationale behind adding another two toroidal flow tubes within each measurement plane or platform of the gyroscope is to increase the overall sensor sensitivity for angular rate measurements. With multiple flow tubes, each fluid flow channel can contain a different fluid, have different dimensions, and can contain particles or markers with differing shapes and size. For the multiple channels, each flow channel provides the angular rates about the concentric axes of the multiple channels and each channel can represent a different range of sensitivity. The particles are tracked within each fluid flow channel and the proper particle to be considered is determined by applying the digital image processing algorithm noted above. The image processing algorithm defines the time series for the location of each particle within the set of concentric flow channels. For each particle, the motion rate is determined instantly. Afterwards, a particle that reflects an insensitive reaction to a low dynamic motion or a particle that shows excessive hyper-reaction to a high dynamic motion can be eliminated from the computation process of the angular rate. It should be noted that a particle is defined as being reactive to an external applied motion based on a prior set of calibration tests performed on the overall system.

Advantages to using a set of concentric toroidal fluid flow channels for each measurement axis include providing redundancy in measurements, higher dynamic range, and higher dynamic sensitivity. Moreover, these multiple flow channels can act as checks for proper measurements. Because of these, the processing algorithm is supplemented with an additional phase by applying a proper estimation algorithm that ensures that the gyroscope provides the best estimate of the angular rate.

For each plane (or platform) on the gyroscope that contains a set of fluid flow channels, there is an opposite plane that contains at least one (i.e. one or more) small, high resolution digital camera module. Preferably, each camera has a high frame rate and a large F.o.V (field of view). Each digital camera preferably has a F.o.V. that ranges from 80° to 120°. Adjacent to each digital camera module is mounted a pair of light sources, preferably one light source on each side of the digital camera module. The light sources are used to illuminate the fluid flow channels. Accordingly, the tri-axial gyroscope according to one aspect of the present invention includes three digital camera modules, with each camera module being opposite a platform or plane with fluid channels. In addition to the above, the gyroscope includes six or more light sources with each pair of light sources being adjacent a corresponding digital camera. The digital camera modules and light sources are all connected to a wiring block that facilitates the connection of the electronic elements to an on-board electronic processing unit. The on-board electronic processing unit is used to implement the image processing methods as explained above and such image processing is performed in real time or near real time.

Regarding the electronic processing unit, this unit is connected to an interface and, as such, the unit operates as a controller for the gyroscope and can be used for providing feedback for a machine, or robot. As well, the unit can be used for performing automated mobile navigation and mapping. The interface also includes a monitor that provides the measurements for instantaneous visualization and the unit also operates as a storage module for data storage. The total assembly of electronic modules are connected to a power supply, as shown in FIGS. 7A and 7B.

Preferably, the gyroscope is provided with thermal compensation mechanism compensates for changes in ambient temperature and internal temperature variations. The thermal compensation mechanism may take the form of internal ventilation passageways that isolate the fluid-contained compartments as depicted in FIGS. 6A and 6B. The thermal compensation mechanism includes a thermal sensor that measures the system temperature within the gyroscope and the measured temperatures are fed back into the processing unit to cause the application of a thermal compensation factor to the acquired angular rate measurements. This thermal compensation factor is predetermined for the gyroscope through a series of calibration tests that are preferably performed as an integral part of the system manufacturing process.

Gyroscope Experimentation and Validation

To validate and prove the concept of the gyroscope according to the present invention, a series of experiments were held to determine the performance of the gyroscope. The experiments mainly address the sensor response validity in terms of amplitude and SNR. Furthermore, the experiments address the hypothesis that the gyroscope is nearly drift free and that the sensor can maintain substantially long periods of time with no induced errors in the gyroscope output signal.

Gyroscope Response Validation

The objective of this experiment is to test the gyroscope response to external angular rates. The experiments were designed to address the amplitude response of the gyroscope for a given dynamic range. The amplitude response of a sensor is a measure of system interaction under the impact of the external effect. It is a measure of the system's ability to faithfully sense and transmit the information required from the sensor to measure.

The experimental setup was simple—the experiments were held in a laboratory, with the gyroscope being placed and centered on a servo driven turntable. The turntable was a high-end turntable that is used for precise calibration and angular rate tests for angular rate sensors. The turntable has two degrees of freedom (D.o.F.) and is controllable via a PC-connected controller. The turntable can be operated within a wide range of input angular rates, up to 220°/s, and with a range of operating angular accelerations, up to 50°/s$^2$. For these experiments, the turntable was used in a single D.o.F. setup to test a single axis of the gyroscope.

To be more conservative and to validate the gyroscope measurements, the experiments were performed simultaneously with another reference gyroscope mounted on the turntable. The reference gyroscope was a stable commercial sensor that is used for inertial navigation. The turntable was used to test a single axis of the gyroscope of the present invention over a series of experiments at different angular rates that were chosen to test the operability of the gyroscope for the dynamic range encountered by most typical navigation and mobile mapping platforms. The gyroscope was tested for its response to different values of angular accelerations to determine the sensitivity of the gyroscope's angular rate measurements to angular accelerations. The angular acceleration test is referred to as the centrifuge tests [3]. The input angular rates for the tests were within the range of 10°/s to 180°/s and the angular acceleration values ranged from 10°/s$^2$ to 50°/s$^2$. The experiments were held such that each value of angular acceleration was fixed while the values of the angular rates were changed from 10°/s to 180°/s with increments of 30°/s apart. The angular acceleration value was increased by increments of 10°/s$^2$ and the angle rate tests were repeated. The duration of each experiment was about 1 minute per experiment.

Experimental Results

Figure 8A:
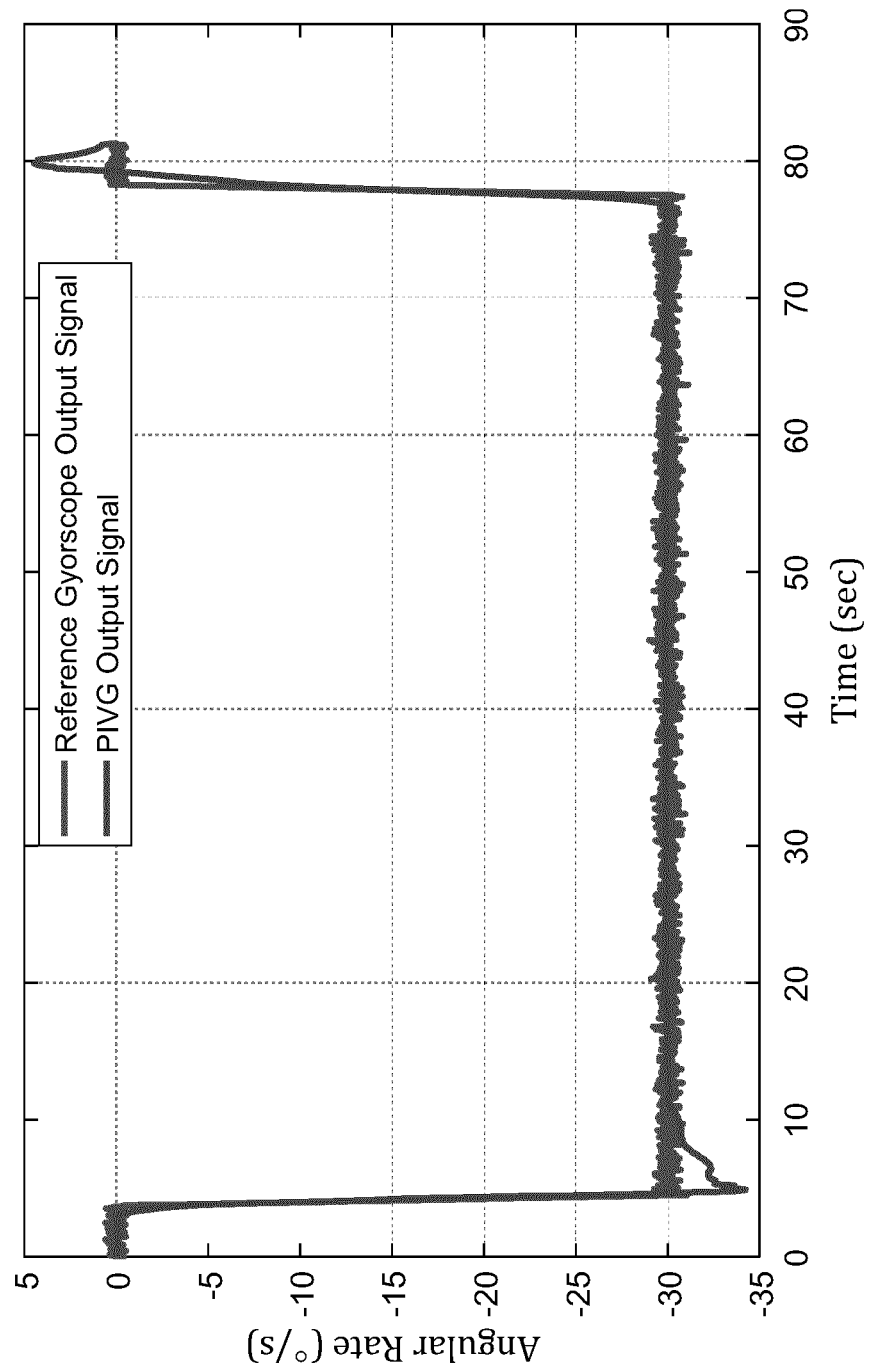
FIGS. 8A to 8D show experimental results acquired from a series of angular rate tests performed using a gyroscope according to one aspect of the present invention.
Figure 8B:
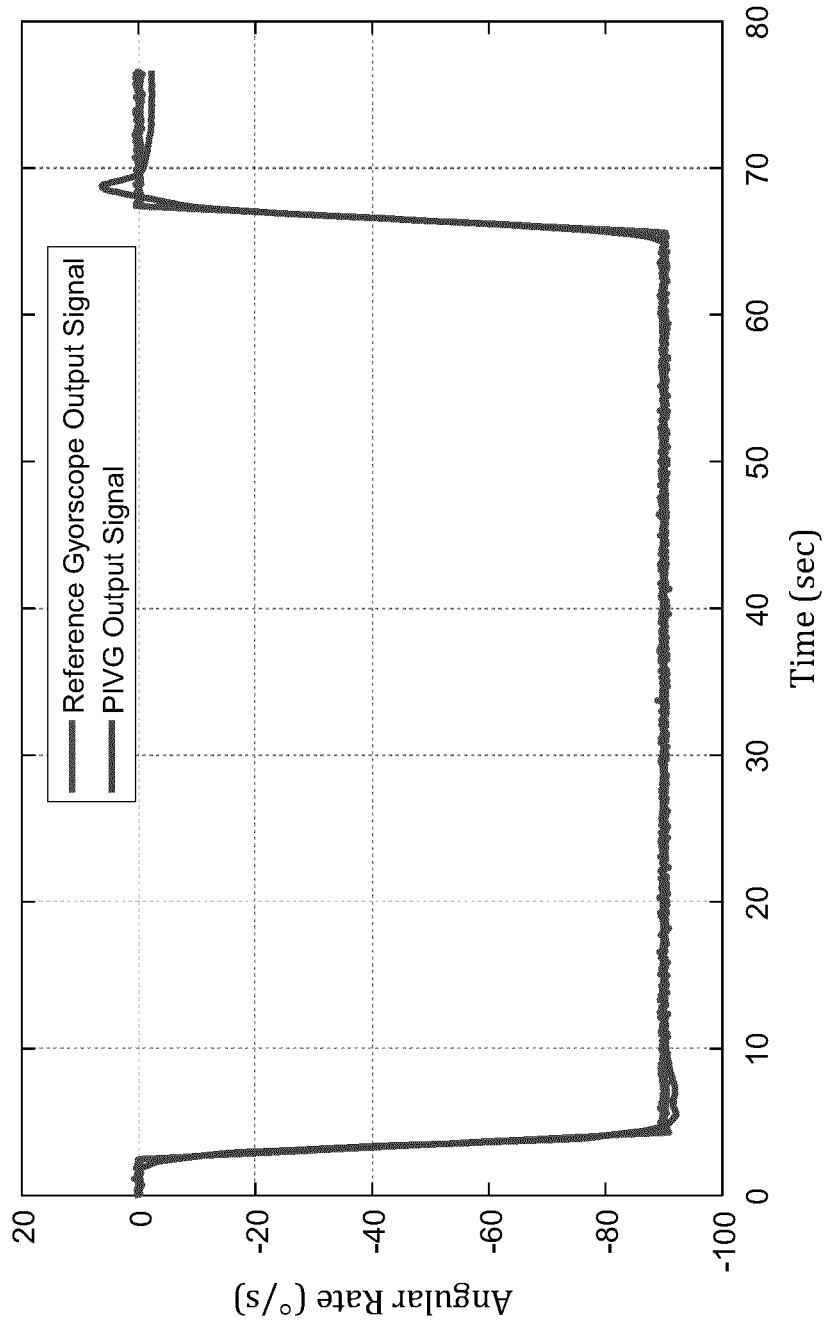
Figure 8C:
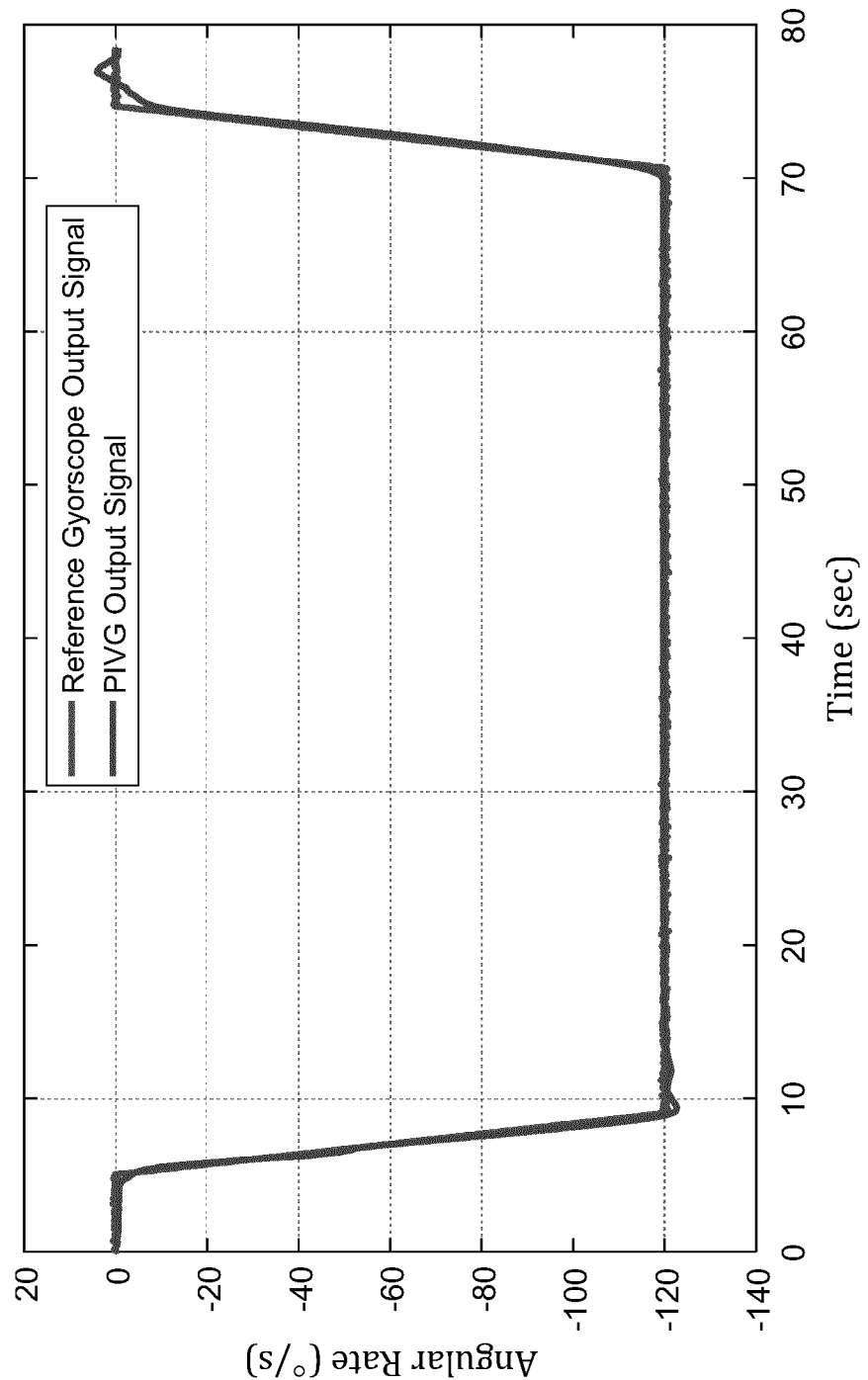
Figure 8D:
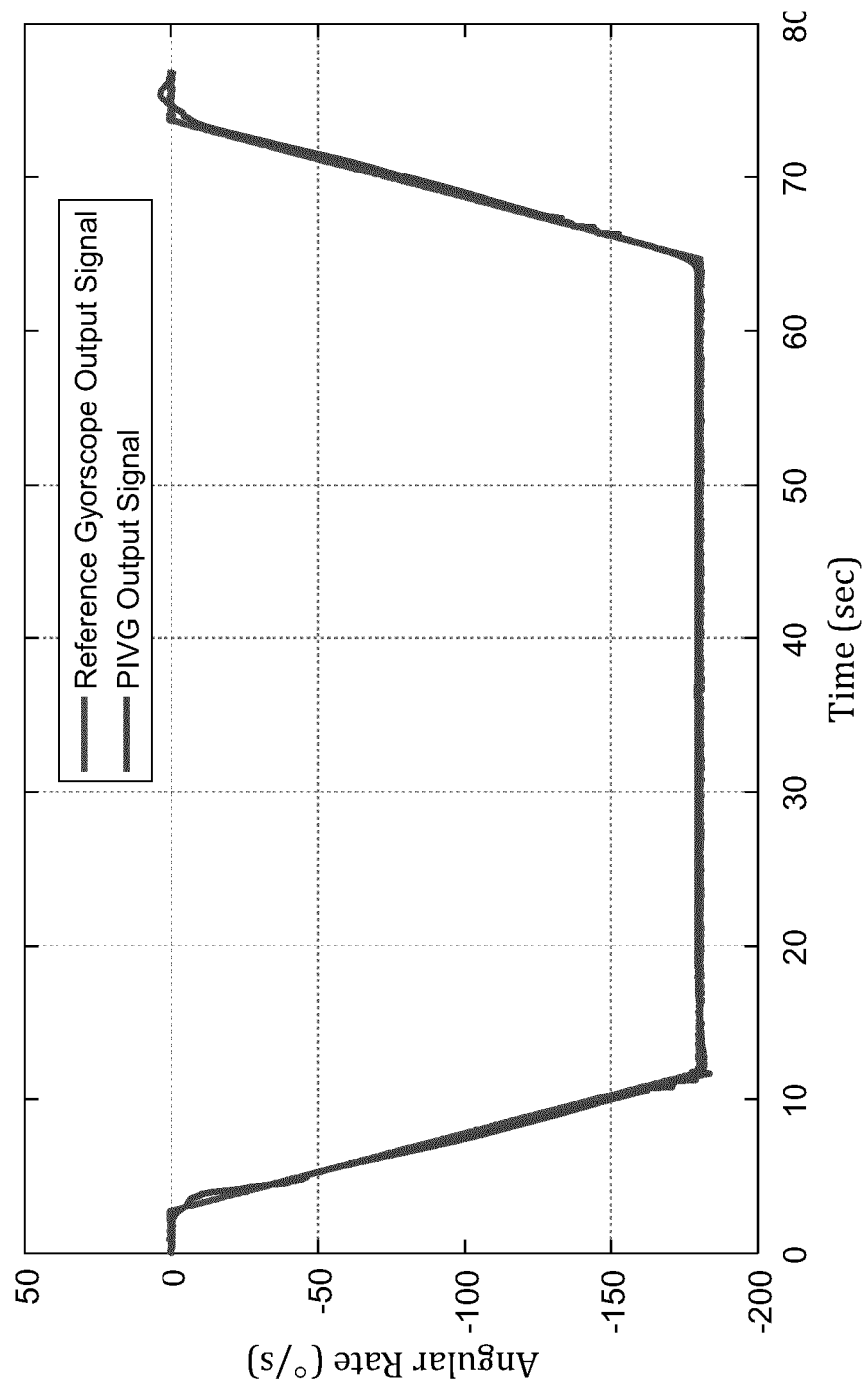

FIGS. 8A to 8D show a sample of the experimental results acquired from the series of angular rate tests performed on the gyroscope when compared with the reference gyroscope. FIG. 8A shows the gyroscope output signal versus the reference gyroscope at an angular rate of 30°/s and at an angular acceleration of 40°/s². FIG. 8B shows the gyroscope output versus the reference gyroscope at an angular rate of 90°/s and at an angular acceleration of 50°/s². FIG. 8C shows the gyroscope output versus the reference gyroscope at an angular rate of 120°/s and at an angular acceleration of 30°/s². FIG. 8D shows the gyroscope output versus the reference gyroscope at an angular rate of 180°/s and at an angular acceleration of 20°/s². It should be clear that the results for the gyroscope according to the present invention are referenced by the term "PIVG" in the figures.

Figure 9:
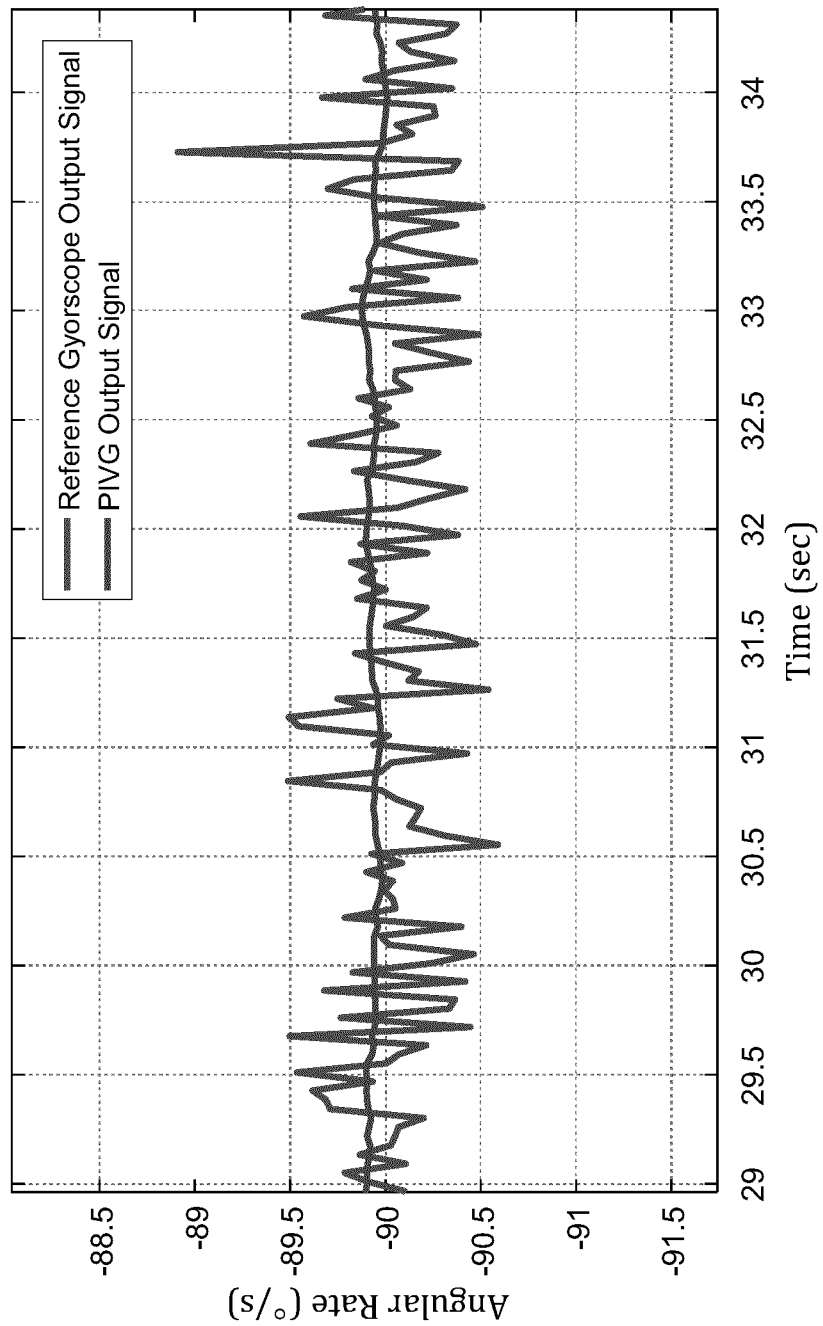
FIG. 9 shows a difference between an SNR of the gyroscope of one implementation of the present invention when compared with a reference gyroscope.

FIG. 9 shows an excerpt of nearly 5 seconds from the experiment held at an input angular rate of 90°/s and at an angular acceleration of 50°/s². The figure emphasizes the difference between the SNR for the gyroscope output signal when compared with the reference gyroscope output signal.

The above results show that the gyroscope of the present invention provided substantially accurate results when compared with the input angular rates from the turntable controller and with the reference gyroscope results. Additionally, the gyroscope processing model demonstrates a substantially proper response with minimal delay when compared with the reference gyroscope response. The results also show that the gyroscope is not affected by variations in angular accelerations. Moreover, the results show that the gyroscope has a relatively high SNR in comparison with the reference gyroscope.

Finally, the results of the experiments have shown the repeatability of the gyroscope results under different operating conditions. The gyroscope of the present invention can thus be used as a reliable angular rate sensor for various applications. However, it would be prudent to ensure that the gyroscope passes through a series of calibration tests that would ensure suitable performance. The calibration tests may be used to determine the various sensor modeling parameters and environmental operation conditions for the gyroscope.

Gyroscope Drift-free Validation

One objective of the present invention was to attempt to produce a nearly drift free angular rate sensor, as noted above. This experiment attempts to validate that the gyroscope of the present invention is a nearly drift free angular rate sensor which can operate for substantially long periods of time without the occurrence of drift rate within the output angular rate signal. Typically, there is no angular rate sensor that does not have a component of drift rate within its output. Of course, as noted above, such a drift rate is minimal in high end, expensive inertial sensors. The gyroscope of the present invention has been validated through this experiment to be a nearly drift-free inertial sensor at an extremely low cost when compared with sensors of comparable performance, especially in terms of drift and signal stability.

The experimental setup for this experiment is similar to the experimental setup discussed above for the previous set of validation experiments. However, for these experiments, the gyroscope was mounted on the turntable for a single axis experiment. The duration of the experiment was nearly 5 hours of operation and the turntable was rotated at an angular rate of 60°/s. The data rate of the gyroscope was set to 24 Hz through the frame rate of the utilized camera module. The total number of samples acquired by the gyroscope was 472769 samples.

Experimental Results

Figure 10:
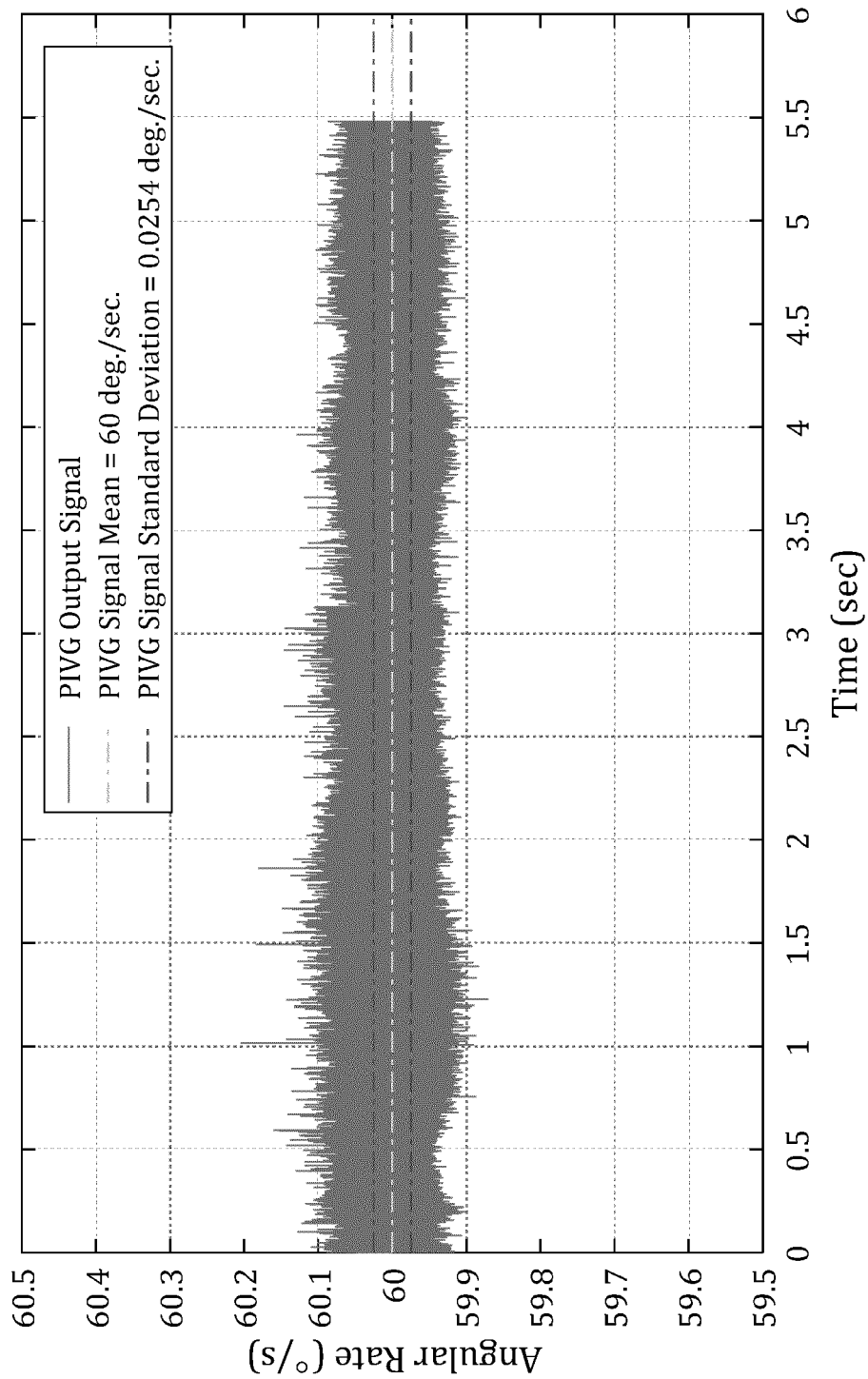
FIG. 10 show results of a drift-free validation experiment conducted using a gyroscope according to one aspect of the present invention

FIG. 10 shows the result of the drift-free validation experiment. The Figure shows the stable portion of the output signal at 60°/s, after excluding the startup portion in which the turntable had to reach its maximum rate from rest. As can be seen from the Figure, signal acquired by the gyroscope is relatively drift-free.

Form the signal shown in FIG. 10, the error signal of the signal can be computed by subtracting the mean of the output angular rate values from the signal. The result shows a zero-mean error signal with a standard deviation of 0.0254°/s.

It should be clear, from the experimental results, that the gyroscope of the present invention has no drift rate in its output signal over an operation period of nearly 5 hours. This covers most of the requirements of inertial navigation applications at a relatively low cost. It should be clear that the SNR shown in the results of this experiment is comparable to the SNR for current state of the art angular rate sensors. This SNR can actually be enhanced by using better imaging sensors with higher spatial resolution.

For a better understanding of the present invention, the following references may be consulted. Each of these references is hereby incorporated in their entirety by reference.

[1] A. Noureldin, T. B. Karamat, and J. Georgy, Fundamentals of Inertial Navigation, Satellite-based Positioning and their Integration, 1st ed. Berlin: Springer-Verlag Berlin Heidelberg, 2013.

[2] P. D. Groves, "Navigation using inertial sensors [Tutorial]," IEEE Aerospace and Electronic Systems Magazine, vol. 30, no. 2, pp. 42-69, February 2015.

[3] D. Titterton and J. L. Weston, Strapdown inertial navigation technology, vol. 17. IET, 2004.

[4] R. Pittman, "Rate Integrating Gyroscope" U.S. Pat. No. 3,359,806, 26 Dec. 1967.

[5] R. Feinberg and Z. M. I, "Fluid rate-integrating gyro," U.S. Pat. 3,261,213, 19 Jul. 1966.

[6] Lande Reinhard N, "Integrating rate gyroscope," U.S. Pat. 2,951,377, 6 Sep. 1960.

[7] Diamantides Nick D, "Rate gyroscope," U.S. Pat. No. 3,367,194, 6 Feb. 1968.

[8] Summers Jr Thomas O, "Rate integrating gyro," U.S. Pat. No. 2.951.375, 6 Sep. 1960.

[9] Marius E. Huvers, "Rate integrating gyroscopic aiming method and device therefor," U.S. Pat. No. 4,087,919, 9 May 1978.

[10] Ogren Harvey D, "Vortex rate sensor," U.S. Pat. No. 3,203,237, 31 Aug. 1965.

[11] P. D. Senstad, "Magnetically and electrically rebalanced vortex rate sensor," U.S. Pat. No. 3,230,765, 25 Jan. 1966.

[12] D. Barrett, "Vortex rate sensor," U.S. Pat. No. 3,240,060, 15 Mar. 1966.

[13] F. J. Camarata, "Twin vortex angular rate sensor," U.S. Pat. No. 3,447,383, 3 Jun. 1969.

[14] L. M. Sieracki, "Vortical comparator," U.S. Pat. No. 3,452,768, 1 Jul. 1969.

[15] J. F. Burke, J. L. Dunn, and K. R. Scudder, "Pick-off for fluid angular rate sensor," U.S. Pat. No. 3,454,023, 8 Jul. 1969.

[16] Neradka Vincent F, "Ac vortex rate sensor," U.S. Pat. No. 3,529,613, 22 Sep. 1970.

[17] T. G. Heilmann, C. C. K. Kwok, and Z. J. Lapinas, "Angular rate sensor," U.S. Pat. No. 3,604,273, 14 Sep. 1971.

[18] G. L. Frederick, "Constant gain laminar jet angular rate sensing device," U.S. Pat. No. 4,945,764, 7 Aug. 1990.
[19] S. Lees, "Integrating angular accelerometer," U.S. Pat. No. 2,983,149, 9 May 1961.
[20] L. B. Taplin, "Integrating angular accelerometer," U.S. Pat. No. 4,002,077, 11 Jan. 1977.
[21] L. B. Taplin and B. R. Teitelbaum, "Integrating angular accelerometer," U.S. Pat. No. 4,361,040, 30 Nov. 1982.
[22] R. Pittman, "Fluid Rotor Sensor" U.S. Pat. No. 3,142,991, 4 Aug. 1964.
[23] B. B. Sage and H. Kase, "Fluid Rotor Angular Rate Sensor-3 axis Angular Rate Sensor utilizing SMAE," U.S. Pat. No. 3,682,003, 8 Aug. 1972.
[24] C. Andreou, Y. Pahitas, and J. Georgiou, "Bio-Inspired Micro-Fluidic Angular-Rate Sensor for Vestibular Prostheses," Sensors, vol. 14, no. 7, pp. 13173-13185, July 2014.
[25] S. Liu and R. Zhu, "Micromachined Fluid Inertial Sensors," Sensors, vol. 17, no. 2, p. 367, February 2017.
[26] L. D. Statham, "Angular Accelerometer," U.S. Pat. No. 2,778,623, 22 Jan. 1957.
[27] H. D. Morris and J. T. Buckingham, "Fluid Rotor Angular Accelerometer," U.S. Pat. No. 3,520,196, 14 Jul. 1970.
[28] T. S. Amlie, "Mercury Filled Angular Accelerometer," U.S. Pat. No. 3,131,565, 5 May 1964.
[29] E. Schatz, "19-Angular Acceleration Sensor," U.S. Pat. No. 3,603,158, 7 Sep. 1971.
[30] Malcolm James S and Thomson George M, "Gas pressure operated rate gyroscope," U.S. Pat. No. 3,254,538, 7 Jun. 1966.
[31] Mac Donald W, "Angular accelerometers," U.S. Pat. No. 3,810,393, 14 May 1974.
[32] H. Jurgens Wolfaardt and P. Stephan Heyns, "Dynamic Modeling of a Novel Microfluidic Channel Angular Accelerometer," Journal of Vibration and Control, vol. 14, no. 4, pp. 451-467, April 2008.
[33] S. W. Arms and C. P. Townsend, "MEMS Based Angular Accelerometer," US Patent Application Publication 2003/0047002 A1, 13 Mar. 2003.
[34] K. R. Benedetto and L. J. Linder, "Angular acceleration sensing apparatus," U.S. Pat. No. 4,232,553, 11 Nov. 1980.
[35] A. Lawrence, Modern Inertial Technology: Navigation, Guidance, and Control, 2nd ed. New York: Springer-Verlag, 2001.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. An assembly for use in gyroscope applications, the assembly comprising:
   a planar platform comprising at least two concentric torus-shaped, liquid filled channels having a common center, each of said at least two channels containing at least one marker, said at least one marker being displaced from its resting position by forces applied to said platform;
   a marker tracking subsystem for determining an amount of displacement of said at least one marker from a resting position of said at least one marker whenever said at least one marker is displaced by said forces;
   wherein
   said at least two markers are neutrally buoyant in said liquid filling said at least two channels; and each of said at least two channels and their respective markers have different sensitivities to external forces than other channels in said platform.

2. The assembly according to claim 1, wherein said channel is transparent and said marker tracking subsystem comprises:
- at least one optoelectronic sensor for imaging said marker in said channel;
- a data processing system for image processing to determine a position of said at least one marker after said at least one marker has been displaced from its resting position by said forces.

3. The assembly according to claim 2, wherein said at least one optoelectronic sensor is placed proximate to said channel such that a field of view of said camera includes a view of said channel and said at least one marker.

4. The assembly according to claim 2, wherein said data processing system also determines a position of said at least one marker prior to said forces being applied to said platform.

5. The assembly according to claim 2, wherein said at least one optoelectronic sensor comprises a digital camera.

6. The assembly according to claim 1, wherein said at least one marker is sphere shaped.

7. The assembly according to claim 1, further comprising a temperature compensation subsystem for compensating for changes in temperature such that a performance of said assembly is substantially unaffected by temperature.

8. A gyroscope comprising:
- three assemblies for determining directions of forces applied to said gyroscope, each assembly being configured to determine forces applied relative to a specific plane;

wherein
each assembly comprises:
- a planar platform comprising at least one torus-shaped, liquid filled channel containing at least one marker, said at least one marker being displaced from its resting position by forces applied to said platform;
- a marker tracking subsystem for determining an amount of displacement of said at least one marker from its resting position whenever said at least one marker is displaced by said forces;

wherein
said at least one marker is neutrally buoyant in said liquid filling said channel;
a plane for each platform is orthogonal to planes for other platforms in its respective assembly;

and wherein, for at least one of said three assemblies, said at least one channel comprises at least two concentric torus-shaped channels having a common center, each of said at least two channels and their respective markers having different sensitivities to external forces than other channels in said at least one of three assemblies.

9. The gyroscope according to claim 8, wherein, for each assembly, said channel is transparent and said marker tracking subsystem comprises:
- at least one optoelectronic sensor for imaging said at least one marker in said channel;
- a data processing system for image processing to determine a position of said at least one marker after said at least one marker has been displaced from its resting position by said forces.

10. The gyroscope according to claim 9, wherein, for each assembly, said at least one optoelectronic sensor is placed opposite said channel such that said field of view of said at least one optoelectronic sensor includes a view of said channel and said at least one marker.

11. The gyroscope according to claim 9, wherein said at least one optoelectronic sensor comprises a digital camera.

* * * * *